April 14, 1964 W. F. LUTZWEIT ETAL 3,129,113
AUTOMATIC POWDER APPLICATOR APPARATUS
Filed Feb. 13, 1962 24 Sheets-Sheet 1

INVENTOR.
WALTER F. LUTZWEIT
ONNI W. NIEMI
BY
Stanley Z Cole
ATTORNEY

April 14, 1964 W. F. LUTZWEIT ETAL 3,129,113
AUTOMATIC POWDER APPLICATOR APPARATUS
Filed Feb. 13, 1962 24 Sheets-Sheet 5

INVENTOR.
WALTER F. LUTZWEIT
BY ONNI W. NIEMI

Stanley Z Cole

ATTORNEY

April 14, 1964   W. F. LUTZWEIT ETAL   3,129,113
AUTOMATIC POWDER APPLICATOR APPARATUS
Filed Feb. 13, 1962   24 Sheets-Sheet 6

INVENTOR.
WALTER F. LUTZWEIT
ONNI W. NIEMI
BY
Stanley Z Cole
ATTORNEY

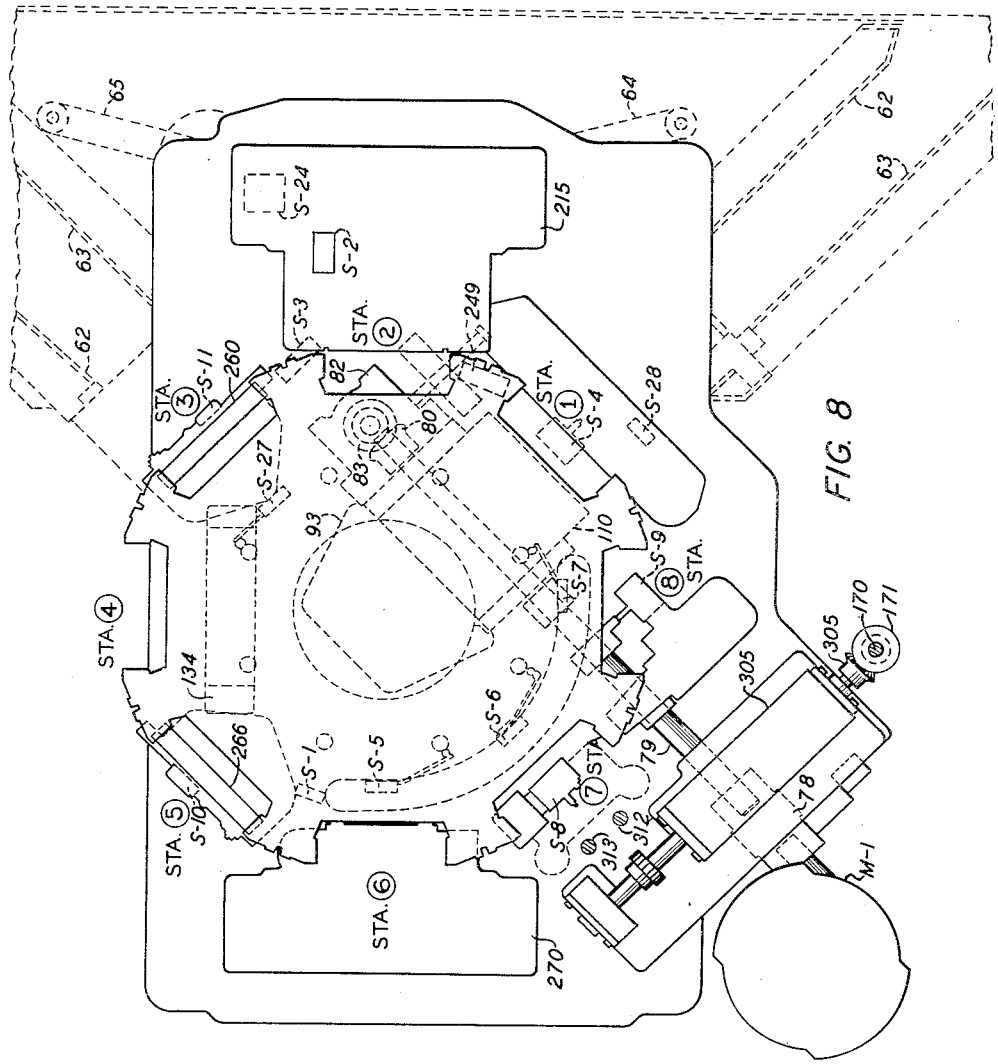

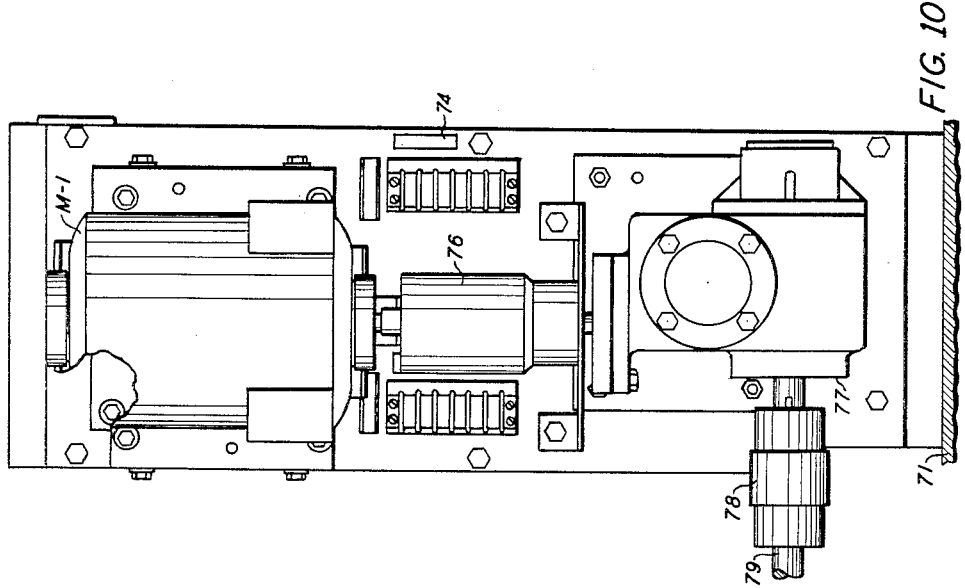
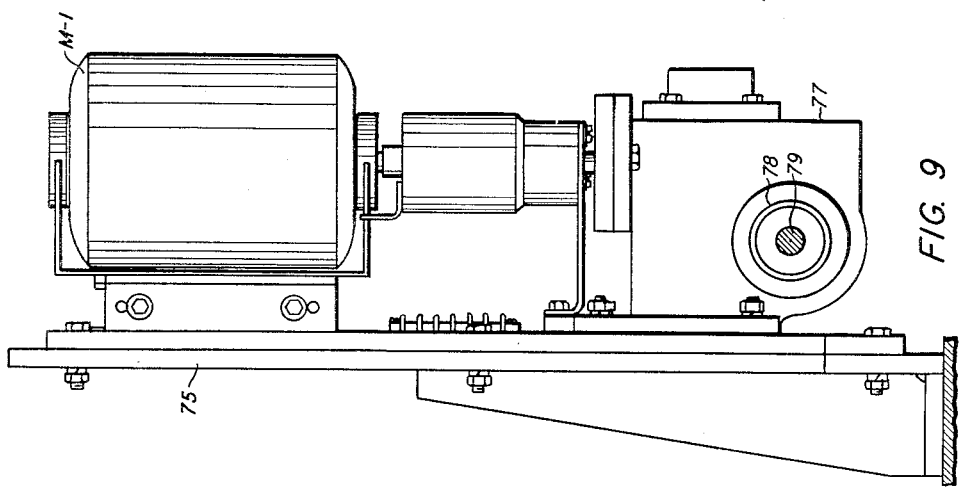

April 14, 1964   W. F. LUTZWEIT ETAL   3,129,113
AUTOMATIC POWDER APPLICATOR APPARATUS
Filed Feb. 13, 1962   24 Sheets-Sheet 9

INVENTOR.
WALTER F. LUTZWEIT
BY ONNI W. NIEMI
Stanley B Cole
ATTORNEY

April 14, 1964    W. F. LUTZWEIT ETAL    3,129,113
AUTOMATIC POWDER APPLICATOR APPARATUS
Filed Feb. 13, 1962                            24 Sheets-Sheet 10

INVENTOR.
WALTER F. LUTZWEIT
BY ONNI W. NIEMI

Stanley B Cole
ATTORNEY

April 14, 1964 W. F. LUTZWEIT ETAL 3,129,113
AUTOMATIC POWDER APPLICATOR APPARATUS
Filed Feb. 13, 1962 24 Sheets-Sheet 11

INVENTOR.
WALTER F. LUTZWEIT
ONNI W. NIEMI
BY
Stanley B Cole
ATTORNEY

April 14, 1964    W. F. LUTZWEIT ET AL    3,129,113
AUTOMATIC POWDER APPLICATOR APPARATUS
Filed Feb. 13, 1962    24 Sheets-Sheet 12

INVENTOR.
WALTER F. LUTZWEIT
ONNI W. NIEMI
BY Stanley Z Cole
ATTORNEY

INVENTOR.
WALTER F. LUTZWEIT
ONNI W. NIEMI

April 14, 1964 W. F. LUTZWEIT ET AL 3,129,113
AUTOMATIC POWDER APPLICATOR APPARATUS
Filed Feb. 13, 1962 24 Sheets-Sheet 14

INVENTOR.
WALTER F. LUTZWEIT
ONNI W. NIEMI
BY Stanley Z Cole
ATTORNEY

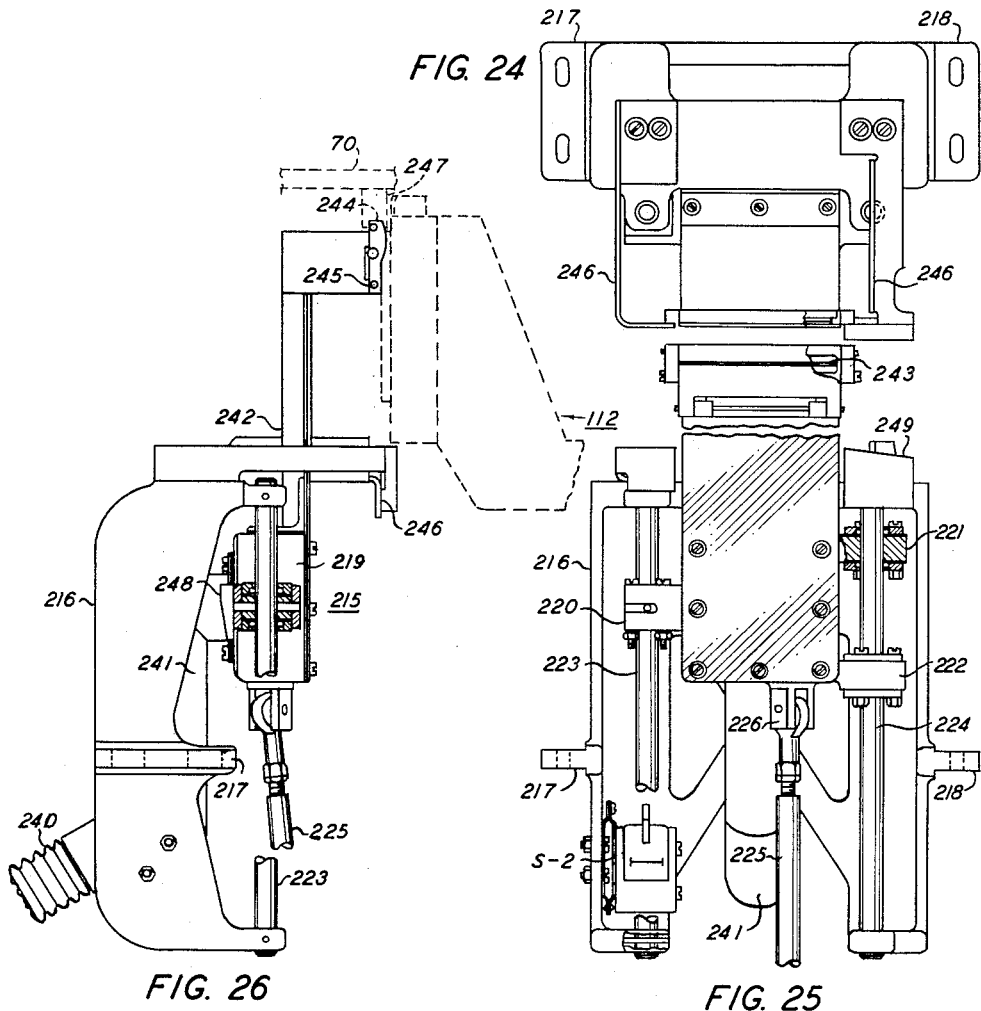

April 14, 1964   W. F. LUTZWEIT ETAL   3,129,113
AUTOMATIC POWDER APPLICATOR APPARATUS
Filed Feb. 13, 1962   24 Sheets-Sheet 17

INVENTOR.
WALTER F. LUTZWEIT
ONNI W. NIEMI
BY Stanley B Cole
ATTORNEY

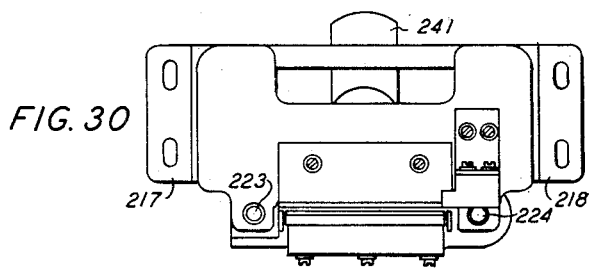
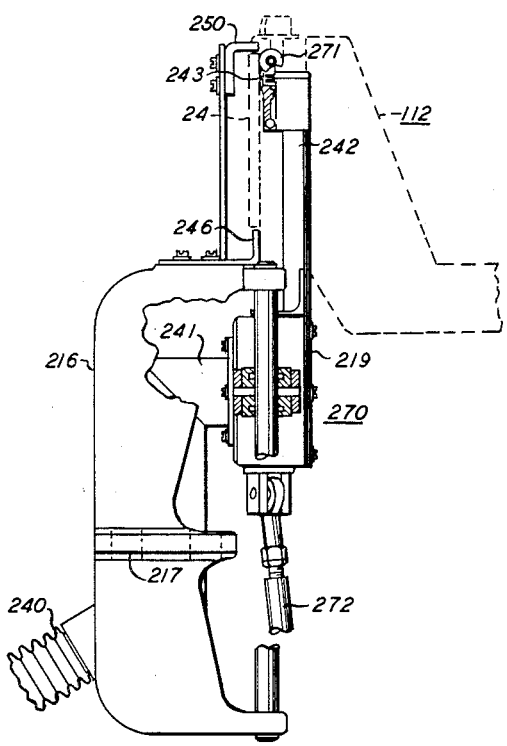
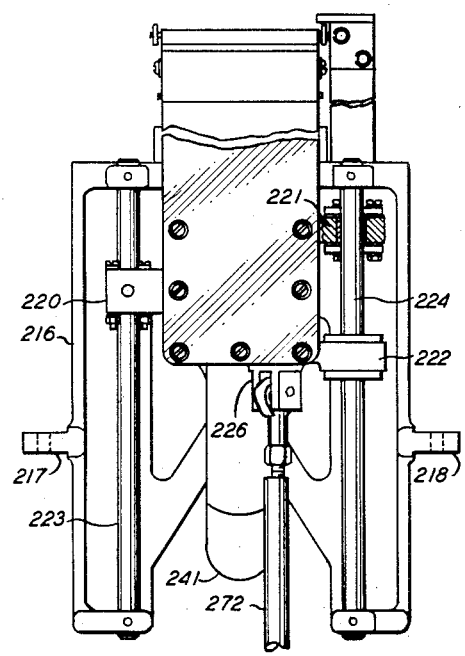

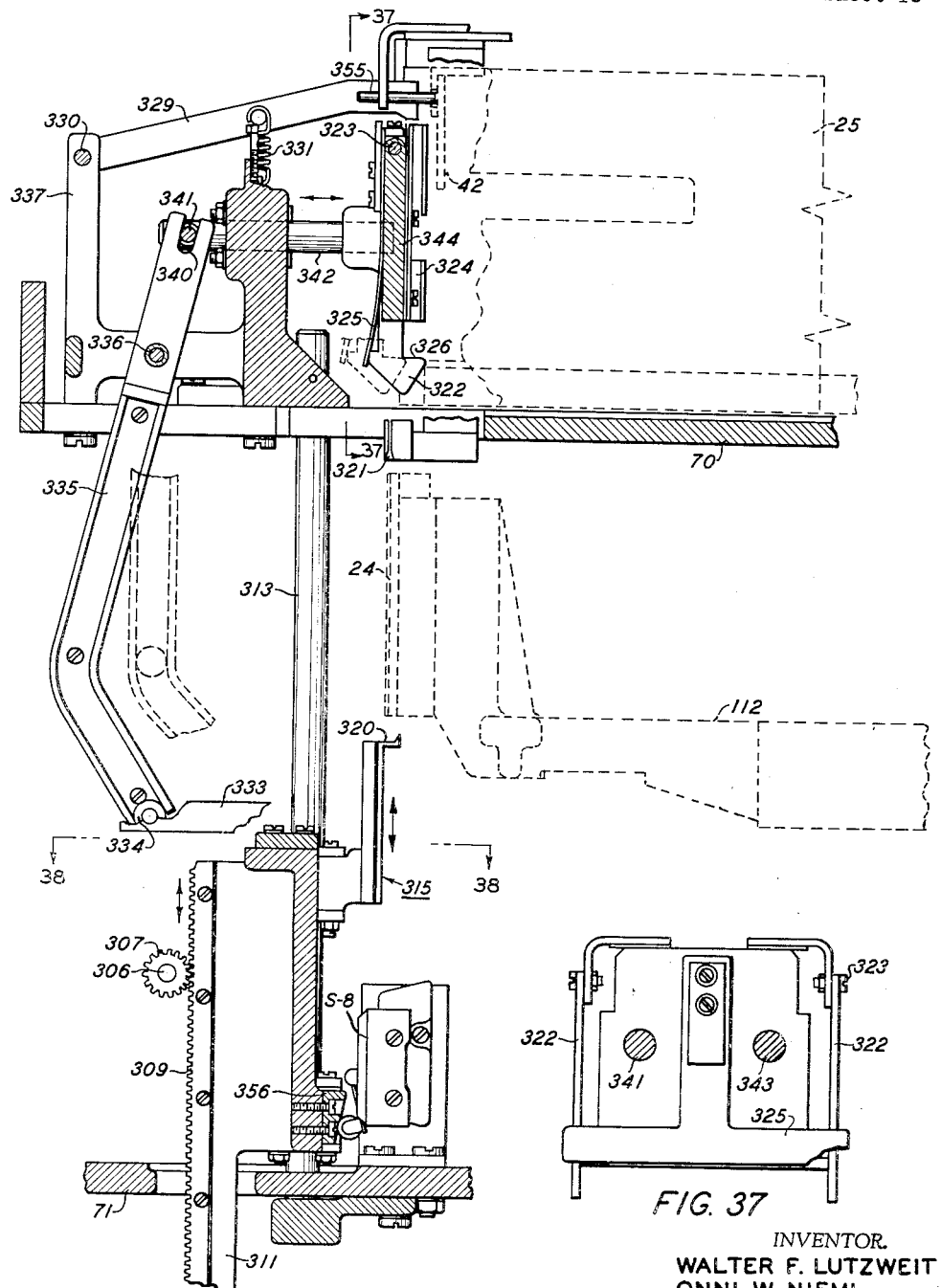

April 14, 1964    W. F. LUTZWEIT ETAL    3,129,113
AUTOMATIC POWDER APPLICATOR APPARATUS
Filed Feb. 13, 1962    24 Sheets-Sheet 23

INVENTOR.
WALTER F. LUTZWEIT
ONNI W. NIEMI
BY Stanley B. Cole
ATTORNEY 3,129,113
AUTOMATIC POWDER APPLICATOR APPARATUS
Walter F. Lutzweit, Rochester, N.Y., and Onni W. Niemi, Santa Monica, Calif., assignors to Xerox Corporation, Rochester, N.Y., a corporation of New York
Filed Feb. 13, 1962, Ser. No. 172,996
10 Claims. (Cl. 118—6)

This invention relates to apparatus for the seriatim dusting of image recording plates. More specifically, the invention relates to automatic processing apparatus for the application of electroscopic powders uniformly onto the surface of image recording plates.

The recording of visual images has become of increasing importance in our modern state of technology as for the preservation of records or the like, and for the dissemination of information. Frequently information as received is not entirely suitable for its ultimate utility requiring transcribing and presentation of the information to recipients in a more conveniently useful form than in which it is received. Thus, with our ever increasing technology, the need for recording of information, more rapidly and more efficiently, has been increasing at an increasing rate as a function of time. For example, the final output information yielded by an electronic computer may assume any one of several forms depending on the nature of the data and its eventual use. With the recent development of high speed computers and other mechanical and electronic devices which produce data at high rates of speed, there has arisen a concomitant need for high speed recording devices, for otherwise speed limitations in the printer or recording mechanism may act to retard the operation of the entire machine.

One of the more rapid electronic methods of printed alphabetic and numerical symbols or characters involves a cathode-ray tube wherein the electron beam is shaped to form a character by projecting the electrons through a very small aperture of the desired pattern as is well known in the art.

Because of the small size of the cathode-ray tube screen, the direct visual display is very limited. The available light intensity on the face of the tube is not sufficient for direct optical enlargement for large scale presentation. While it is known to photograph the screen of a cathode-ray tube and to pass the exposed negative film continuously through a developing and finishing system for optical projection of a positive film, this technique is relatively slow and expensive, and not suitable for use in conjunction with cathode-ray tube presentation. With the advent of xerography, new approaches to the recording of these image presentations have become possible.

In the process of xerography, for example, as disclosed in Carlson Patent 2,297,691, issued October 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image. Thereafter, the developed xerographic powder image may be utilized in a variety of different ways known in the art.

Presentation of the electroscopic powders for the development of electrostatic images has been accomplished in a variety of ways known in the art as by cascading powder over the electrostatic image to effect contact between the image and the powder. Each of the known methods of developing electroscopic images utilizes apparatus that is both complex and cumbersome having large space demands for the presentation and confinement of the developing material. At the same time, development is relatively slow because of the time element necessary to effect the presentation. Furthermore, in these prior systems, close regulation during the development process is required in order to record images with consistency of quality. For example, it is usual to present a quantity of powder termed "toner" to the image by any of various means as by means of a carrier medium, such as a granular bead, an aerosol or pressurized fluid or the like, etc., and during the presentation the relative electrostatic forces of the image and developer effect migration of toner particles to the image. Time, developer densities, etc., are among the factors affecting development properties and the control of which are frequently difficult where high orders of consistency is required.

A novel developing method has recently been evolved as disclosed in Mayo Patent, U.S. 2,895,847, in which electroscopic developing material is supported on a flexible sheet, rigid plate, or the like base termed "a donor" able to support a uniform layer of toner which is presented to the electrostatic image on a xerographic plate. The toner is selectively removed from the donor to the image on the xerographic plate in image configuration. This method affords the advantage of uniform and highly rapid presentation with a minimum of space requirement while achieving a consistency of reproduction fidelity primarily a function of the control quality of developer composition, distribution and adherence on the donor. Thereafter, the developed image on the xerographic plate may be processed by methods conventional in xerography. Optionally where the donor sheet or plate from which the powder is removed is transparent or is accorded a contrast between the toned areas and the toner void areas, the donor plate itself may be utilized for reflex projection or as a transparency depending on whether the plate is opaque or transparent. The time to effect development by this method is limited only by the time required to effect physical face-to-face contact between the developer surface and the xerographic plate. Space requirements to effect development by this method are primarily dependent on the physical dimensions of the donor sheet or plate. That is, in automatic processing of the operation, the surfaces are usually supported in spaced substantially parallel relation with either or both being moved normally into contact with the other.

Now in accordance with the invention, there is disclosed a novel apparatus for the automatic application of electroscopic powders to donors which may subsequently be utilized as aforesaid. The apparatus provides application of electroscopic powders within close tolerances of prescribed uniformity and density. Obviously, however, the apparatus although described primarily in connection with preparing donor plates could be employed for various applications for dusting surfaces including those having utility non-analogous to xerography.

It is therefore an object of the invention to provide apparatus for the dusting of electroscopic powder onto the surface of image recording plates.

It is a further object of the invention to provide apparatus for the automatic processing of image recording plates to control the density and uniformity of electroscopic powder being applied thereon.

It is a further object of the invention to provide apparatus to effect reapplication of electroscopic powder onto a previously dusted donor support with controlled predetermined uniformity.

It is a further object of the invention to provide apparatus for continuously receiving image recording plates from an input magazine, processing plates from the magazine for the uniform application of electroscopic powder, and discharging the plates to an output magazine for subsequent use in remotely located utilization apparatus.

It is a further object of the invention to provide novel plate handling apparatus.

These and other objects of the invention are attained by means of the apparatus of the invention having a plurality of individual process stations past which plates to be dusted are sequentially moved in operative relation. Each station provides an essential step in the processing of the plates which are discharged from the apparatus to an output magazine.

Features of the invention will be brought out and exemplified in the disclosure hereinafter set forth, including illustrations in the drawings in which:

FIG. 8 is a plan view from below the top plate level of FIG. 7;

FIG. 9 is a side elevation of the drive motor mounting;

FIG. 10 is a front elevation of the drive motor mounting of FIG. 9;

FIG. 24 is a plan view of the plate cleaner unit at station 2;

FIG. 25 is a front elevation of the plate cleaner unit of FIG. 24;

FIG. 26 is a side elevation of the cleaner unit of FIG. 24;

FIG. 30 is a plan view of the rear plate-cleaner assembly at station 6;

FIG. 31 is a front elevation of the assembly of FIG. 30;

FIG. 32 is a side elevation of the assembly of FIG. 30;

FIG. 36 is an enlarged sectional elevation taken substantially along lines 36—36 of FIG. 33;

FIG. 37 is a sectional elevation taken substantially along lines 37—37 of FIG. 36;

Figure 1:
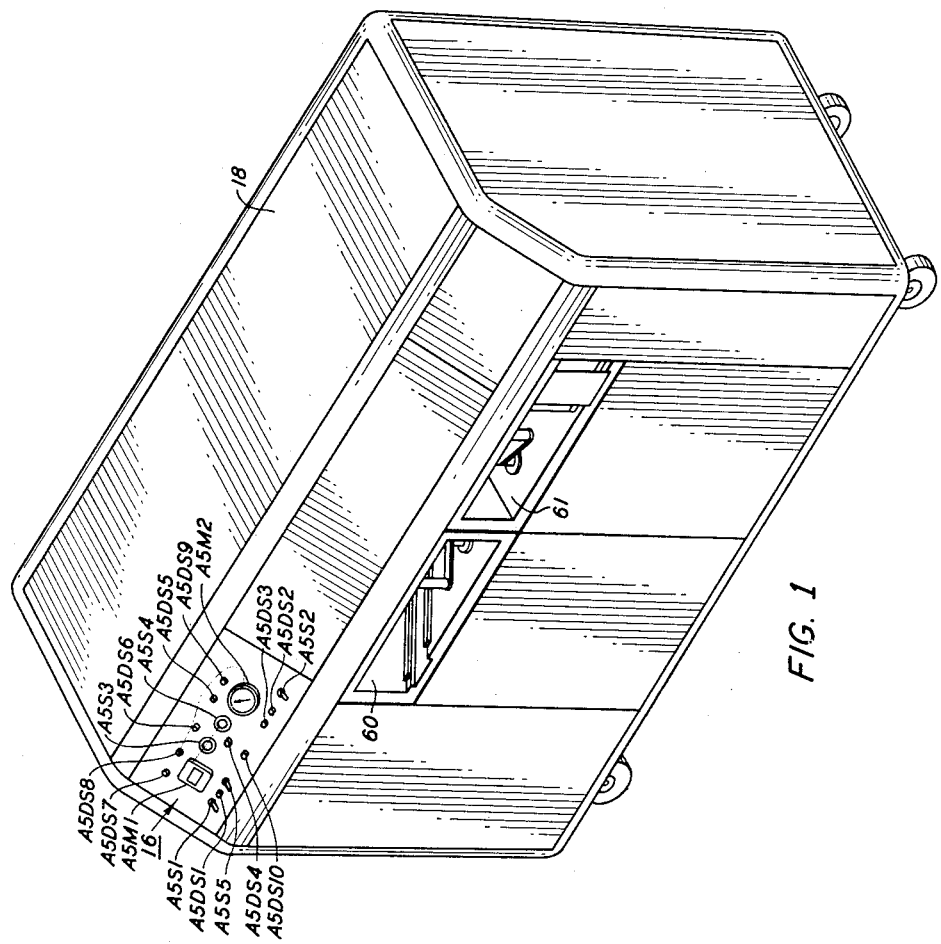
FIG. 1 is an exterior perspective view of the housed unit.

For a general understanding of the invention, reference is made to FIGS. 1 to 6 and 8 of the drawings. The apparatus constitutes a fully enclosed unit, caster mounted on a welded steel frame and designed to operate automatically. The unit incorporates eight major assemblies; the power supply 10, a toner dispenser aerosol generator 11 (hereinafter termed "dispenser generator"), a toner applicator 12, a dust collector 13, a toning density detector 14, a densitometer controller 15, a control panel 16, and an image plate vacuum cleaner 17, all contained in a cabinet 18. The unit is energized by means of an external source of electric power and air pressure which operate, respectively, the unit's electrical and pneumatic systems.

In the embodiment to be described and for purposes of discussion, the image recording plates will be regarded and considered to be of transparent material to be utilized as a donor for forming image transparencies. Obviously, however, any plate, sheet surface or the like having utility supporting a uniform layer of electroscopic powder could be substituted and dusted similarly. Each image plate in the embodiment being described contains an electrically conductive transparent coating on one side only such as tin oxide which side is to receive and retain the electrostatically charged toner particles. Metal side rails are provided on the side edges of the image plate for convenience of handling.

The unit processes image plates at an average rate of approximately twelve seconds per plate, which plates are supplied and discharged in spring-loaded magazines as will be described, having a capacity of approximately 65 plates each. Plates fed from an input magazine are dusted in the apparatus with electroscopic toner. The application of toner within the unit and discharge of the processed plates are accomplished by a series of steps involving eight stations to which the image plates are moved in controlled sequence by means of an indexing transport turret to be described. The stations are shown located in FIG. 8 with the circled digits corresponding generally to the individual stations. Briefly their functional operations are as follows.

*a.* Station 1: Loads clear of previously utilized image plates to be processed from a previously loaded input magazine into a transport turret. Also, the presence of unsatisfactorily processed plates is signaled to a control circuit.

*b.* Station 2: Cleans conductive-coated face of the image plate.

*c.* Station 3: Senses presence or absence of image plates to control energizing of station 4.

*d.* Station 4: Sprays image plate with electrically-charged particles of toner.

*e.* Station 5: Senses presence or absence of image plate to control energizing of toning density detector at station 6.

*f.* Station 6: Cleans uncoated (reverse) face of image plate. Detects density of toner applied to image plate at station 4. Accepts plates with proper toner density, rejects for reprocessing plates with toner density higher or lower than standard, and signals their presence to a control circuit.

g. Station 7: Loads accepted plates into an output magazine. Passes rejected plates to station 8, and signals their presence to the control circuit.

h. Station 8: Passes rejected plates to station 1, and signals their presence to the control circuit.

The unit is operated by both electrical power and compressed air. It is controlled electrically and electronically. The main drive unit operates an indexing transport turret in conjunction with an operating cam which converts rotary motion to reciprocating motion. This reciprocating motion is utilized, through appropriate linkages and gear trains, to perform specific operations in timed sequence as the transport turret indexes image plates through the eight processing stations. A series of micro-switches in conjunction with a program timer, interval, and cycle controls, actuate the devices which load, clean, inspect, tone, and strip image plates as they are indexed from station to station by a transport turret mechanism.

The control panel 16 incorporates all of the controls and instruments required to start and stop the unit and observe its operation in detail. It affords the operator a single place at which he can observe the operation of the apparatus in sequential detail. This panel incorporates the necessary controls for placing the apparatus in operation, for removing all image plates from the transport turret, as well as for stopping the unit when required. It also incorporates indicating devices required to advise the operator of various operating conditions including: (a) adequate plate-cleaning vacuum; (b) adequate supply air pressure; (c) dust collector vacuum; (d) a sufficient minimum level of toner in the dispenser; (e) three successive image plate rejections due to density fault; (f) overloading of the density controller amplifier circuit; (g) either or both the input magazine or output magazine are full or empty; (h) the relative toner density on an image plate under inspection; (i) A.C. power is on or off; (j) measurement of the percent of transmitted light to a plate under inspection; and (k) the total running time for the charging disk contained in the toner applicator.

Image plates are designated 24 and are received and discharged from and to an input and output magazine 25 and 25', respectively, more particularly illustrated in FIGS. 5 and 6 and described hereinafter.

In the embodiment being described, the image plate magazines have a capacity of about 65 image plates each. They are spring-loaded so that the image plates are held in place by spring-operated dogs. On inserting the input plate magazine into the unit, the dogs are released by an actuator assembly as will be described, permitting internal spring pressure within the magazine to force image plates out as required. In the case of output magazines 25', discharged plates are pushed into the magazine. Both plate magazines are identical; the descriptive adjectives merely identifying function. The input magazine is loaded with untoned or previously utilized plates for retoning as aforesaid and is hand carried to the apparatus of the invention. Output magazines, when full are hand carried to remotely located utilization apparatus.

Figure 7:
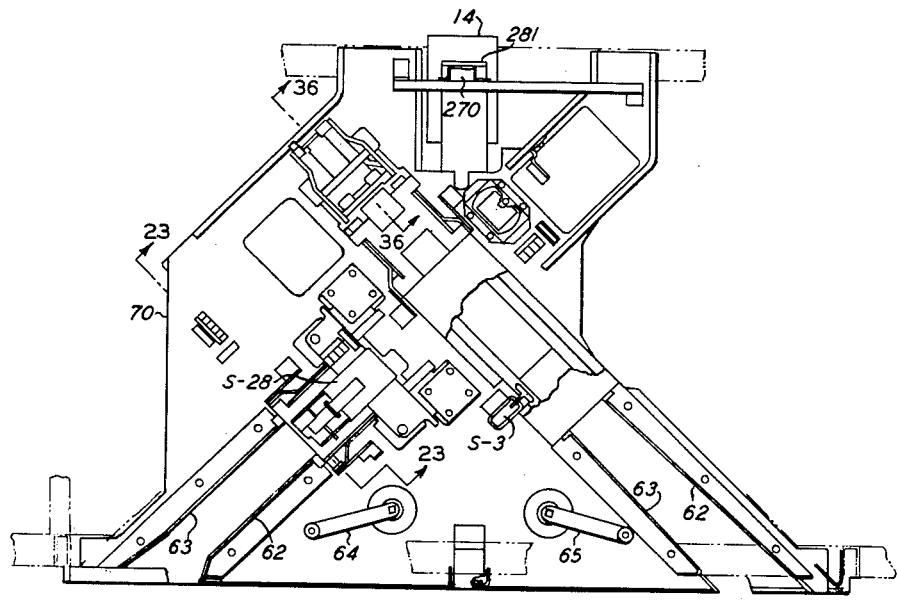
FIG. 7 is a plan view at the top plate level of the apparatus.
Figure 20:
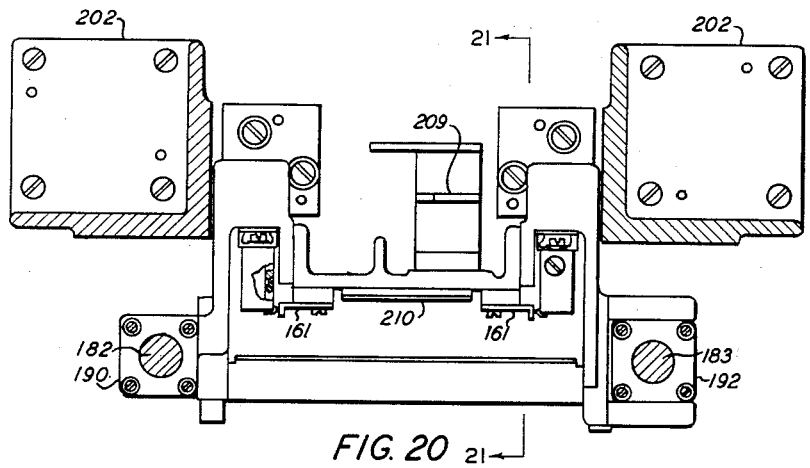
FIG. 20 is a plan partially sectioned view of the turret loading mechanism at station 1.
Figure 11:
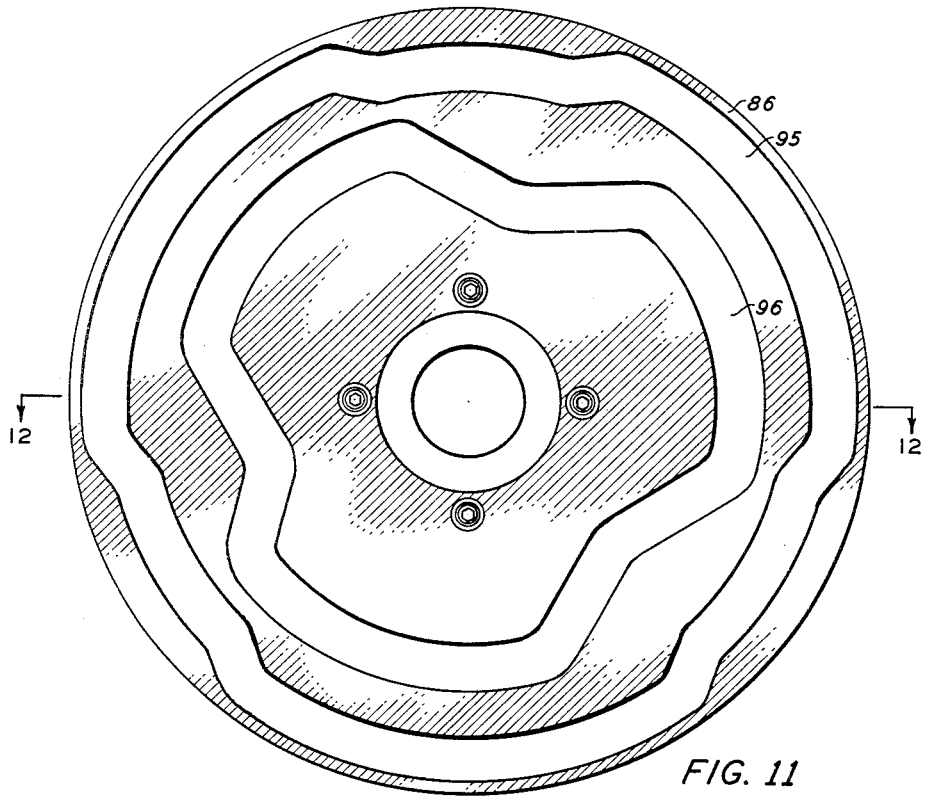
FIG. 11 is a bottom view of the cam.
Figure 12:
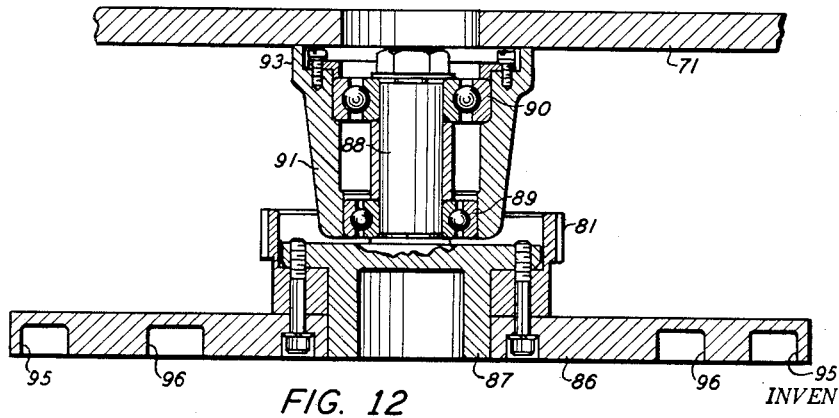
FIG. 12 is a sectional view taken substantially along the lines 12—12 of FIG. 11.

Two openings 60 and 61 are provided in the front of the cabinet adapted to receive the input and output magazines respectively. As the magazines are inserted into their respective openings, they slide over guide rails 62 and 63 (FIG. 7), respectively, until reaching a position in operative relation to the respective stations as determined by a magazine support assembly 30 illustrated in FIGS. 17–19. Lock handles 64 and 65 are rotatably anchored to operate separate wedge locks (not shown) which engage a wedge on the underside of the respective magazines whereby they may be secured in their respective operative positions.

Station 1 is the transport turret load station, at which image plates are removed from the input magazine and fed or inserted into receivers or retaining clamps on a transport turret as the receivers are indexed to this station. Since the magazines are spring-loaded, the plates contained therein are automatically fed into the turret-loading mechanism as will be described. Feeding action continues after exhausting the supply until approximately 70 seconds after the last plate has been loaded from the magazine. After expiration of this time period, a "magazine ready" light is illuminated on the control panel and remains on until the empty magazine is replaced with one containing a new supply of image plates.

The loading mechanism operates after each indexing of the transport turret, assuming no "rejected" image plate was present at station 8 prior to indexing, as will be understood. Since plates are normally discharged at station 7, a plate present at station 8 indicates an inspection rejection at station 6. A rejected image plate at station 1 causes the control system not to activate the station 1 loading mechanism. This action is controlled by control mechanism as will be described.

For supporting the various operating components within the cabinet, there is provided three horizontal support plate members including a top plate 70, an intermediate plate 71, and a bottom plate 72.

Figure 5:
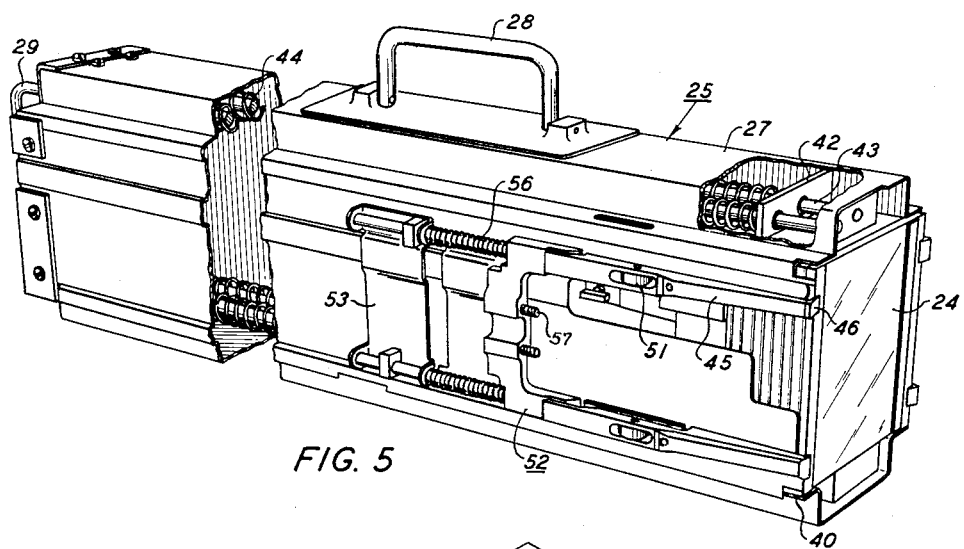
FIG. 5 is an isometric view of an image plate magazine.
Figure 6:
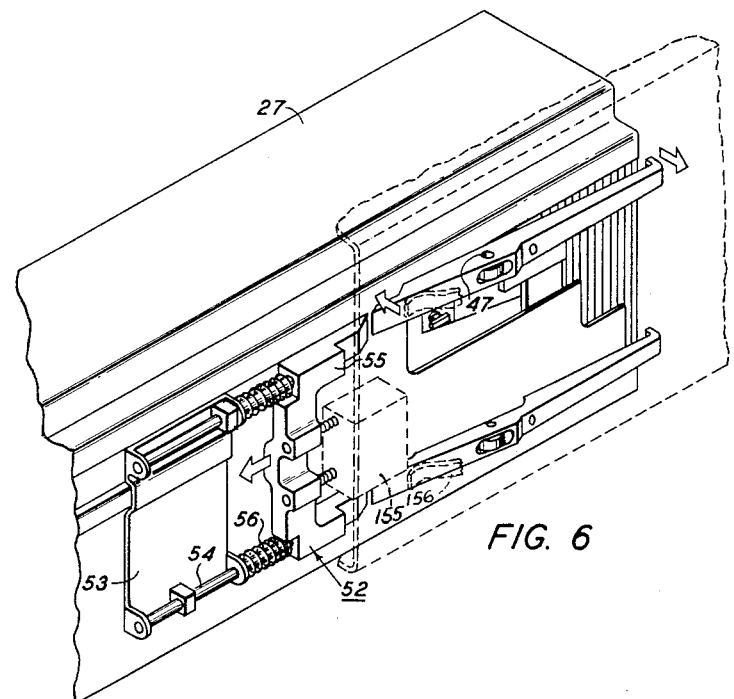
FIG. 6 is a fragmentary isometric view of the magazine of FIG. 5 shown supported to feed or receive image plates within the apparatus.
Figure 17:
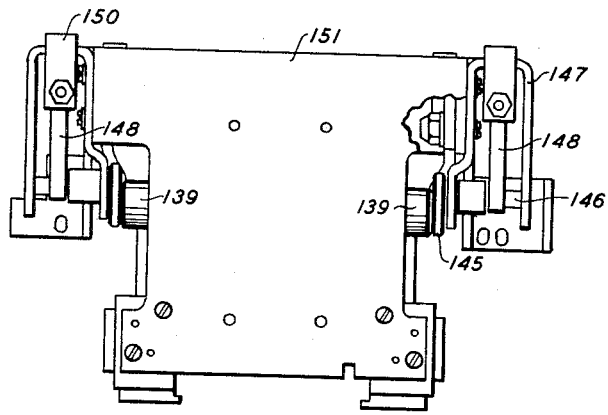
FIG. 17 is a plan view of the magazine support for stations 1 and 7.
Figure 18:
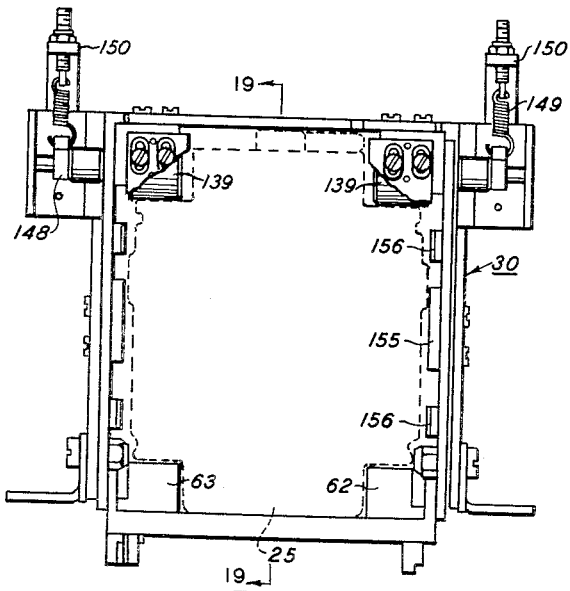
FIG. 18 is an end view of the magazine support.
Figure 19:
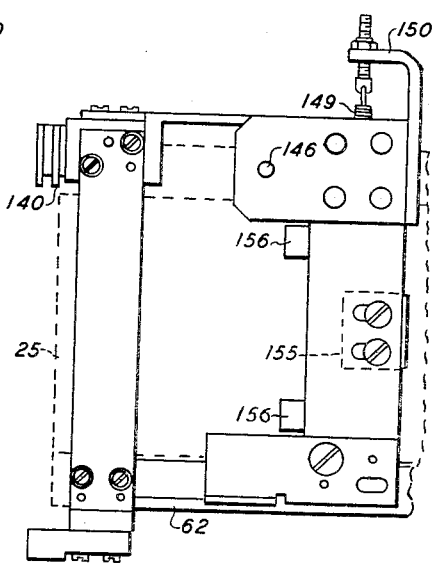
FIG. 19 is a side sectional view taken substantially along lines 19—19 of FIG. 18.
Figure 21:
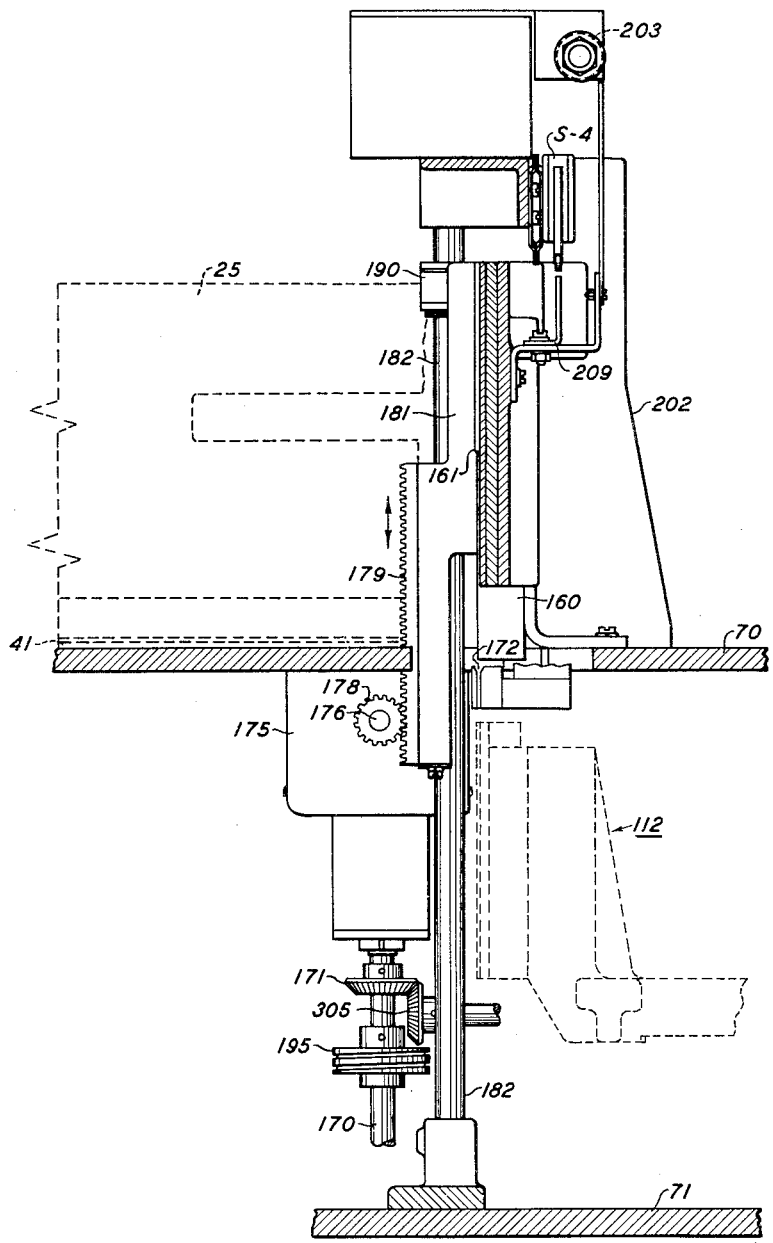
FIG. 21 is a sectional elevation of the apparatus taken substantially along lines 21—21 of FIG. 20.
Figure 22:
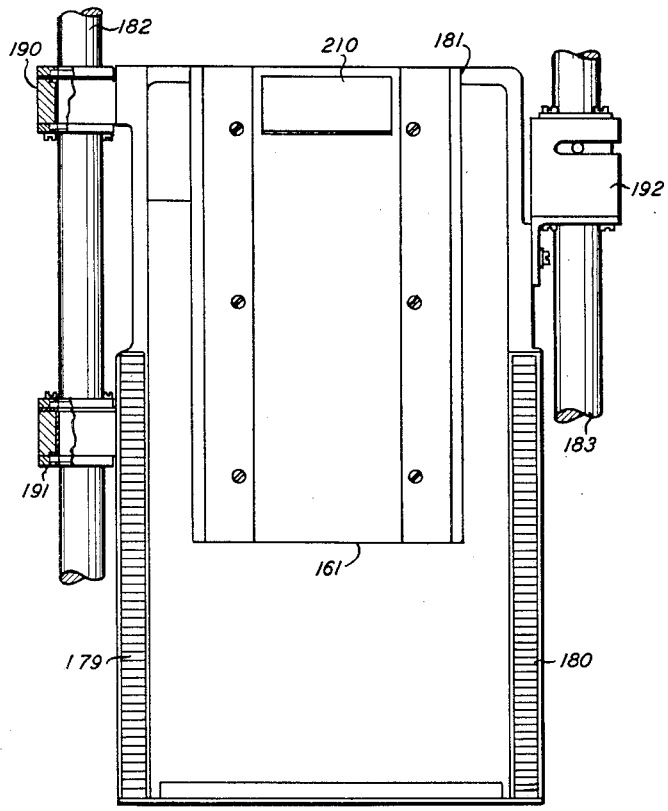
FIG. 22 is a front elevation of the apparatus of FIG. 20.
Figure 35:
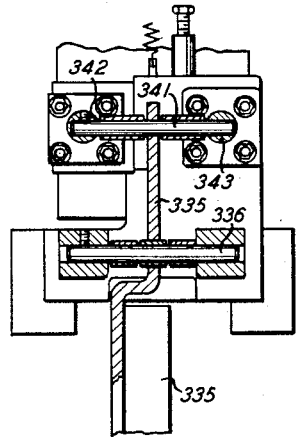
FIG. 35 is an end elevation of the apparatus of FIG. 33.
Figure 34:
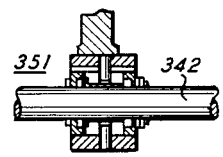
FIG. 34 is a sectional view taken substantially along lines 34—34 of FIG. 33.
Figure 33:
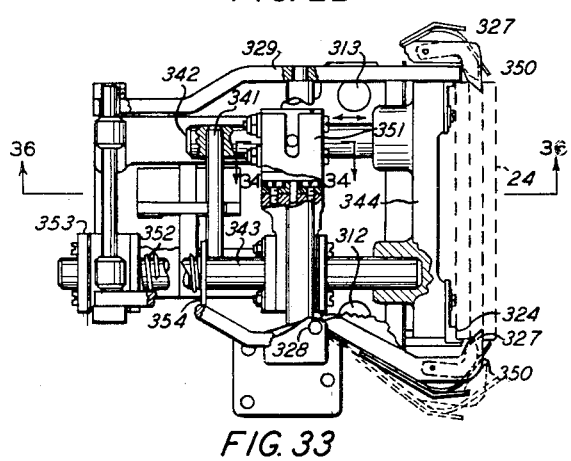
FIG. 33 is a plan view of the plate discharge apparatus at station 7.
Figure 23:
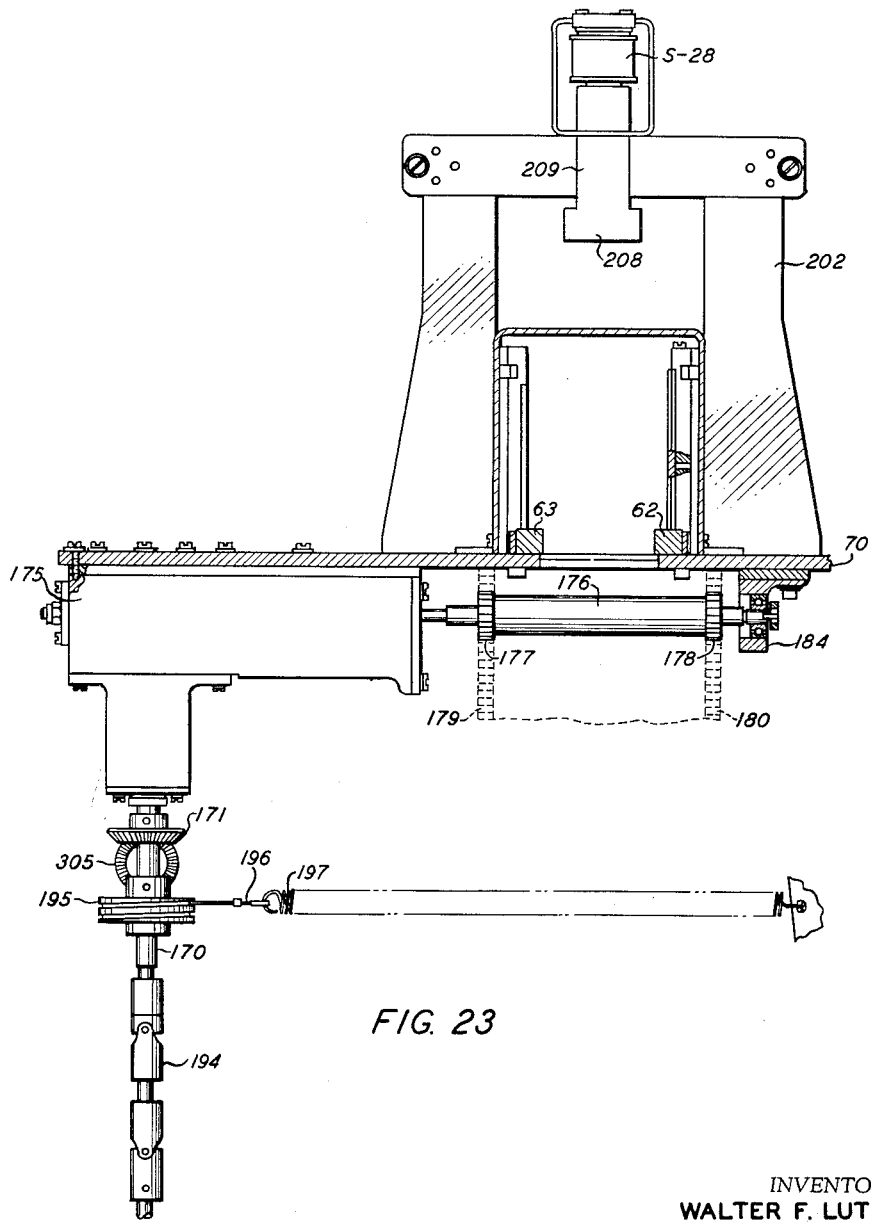
FIG. 23 is a sectional view of the drive mechanism at station 1 and taken parallel to FIG. 22 and substantially along the lines 23—23 of FIG. 7.

Referring now more particularly to the FIGS. 5 and 6, the magazines 25 and 25' are comprised of an elongated case 27 open at one end from which plates are supplied and loaded depending on whether the magazine is being used for input or output, and is blind at the opposite end. The plates are stacked upright in the case one behind the other. A handle 28 is provided to enable convenient carrying of the magazine by hand. A handle grip 29 enables inserting and removing the magazine from its operative position in the apparatus. As viewed in FIG. 5, the right end of the illustration is the open end through which image plates are supplied and loaded and which in operation is positioned relative to a turret as will be described. Each case has recessed portions 40 extending the length of the case along the bottom edges for seating on support rails 62 and 63 of support assembly 30 (FIGS. 17–19).

The image plates 24 are stacked upright within the case and are urged toward the open end by a follower plate 42 supported on four parallel runners 43. About the runners are coiled springs 44 that urge the follower plate against the image plates to urge them toward the open end. When not being utilized, the image plates are restrained against the urgence of the follower plate by four dogs 45, two on each side of the case, and which terminate in a hook 46 maintained in front of the first image plate as shown. When disengaged, the dogs are resiliently pivoted about a pivot 47 on which a coil spring 51 urges the hook of the dogs away from in front of the first image plate to provide, in effect, unimpeded plate passage to or from the magazine as will be understood. However, the dogs are normally maintained closed and grasping the first plate by means of an actuator assembly 52 that normally engages the bevel on the back end of the dogs. This overcomes the resilience of spring 51 until the front hook inhibits the image plates against movement being urged by the follower plate.

One actuator assembly 52 is mounted on each side of the case and includes a bracket 53 secured to the case and supporting a pair of fixed pins 54 on which is supported actuator 55 having engagement pins 57. Spring 56, compressed between the actuator and the ears of the bracket, urges the actuator in the same relative direction as the follower plate, until the bevel on the actuator coacts with the bevel on the dogs to close them as aforesaid.

Release of the dogs is effected via the magazine support assemblies 30 which will now be described in more detail by referring more particularly to FIGS. 17–19. Since two such assemblies are provided, and are substantially identical in structure but different in function, only the input magazine 25 assembly utilized in connection with station 1 will be described.

As stated above, the magazine is inserted over guide rails 62 and 63. As it approaches operative position, it is urged downward in tight relation against the rails by a pair of resiliently supported guide rollers 139 that ride in upper recess 40 of the magazine. The magazine is pushed forward until contacting magazine stops 140, which defines operative position for the magazine, and which position is secured by means of lock handle 64.

Each roller 139 is rotatably mounted off the pivot center of a rocker 145 secured pivotally toward its rear on a roller pivot 146 secured in a brace 147. An elongated bar 148 is secured at one end to pivot 146 and, at the opposite end, the bar is supported by a spring 149. The spring is continuously under tension from a support bracket 150 such that the spring via support bar 148 and rocker 145, caused to rock about the pivot axis, urge rollers 139 compressibly against the magazine 25 being inserted thereunder. A cover plate 151 forms a portion of the assembly to provide rigidity.

As the magazine approaches its forwardmost position against stop 140, it encounters a pair of oppositely supported metal obstructions 155 which bear against pins 57 of actuator assembly 52. This prevents further advancement of the actuator assembly causing the assembly to be retracted against the urgence of spring 56 as the remainder of the magazine advances toward the stop. This then permits dogs 45 to pivot about pivot 47 and which are assisted and urged to open by means of four springs 156 that engage the dog hooks 46 in operative position. In this position, the image plates are uninhibited and permitted to emerge into loading position at station 1.

Before describing the operation at station 1, an understanding should be had of the drive mechanism for furnishing the sequential motive forces and which will now be described with reference to FIGS. 4 and 8–16. Drive is provided by a motor M–1 which is operative in its proper timing sequence by appropriate circuitry described below. A clip 74 retains the contact protector diode. The motor is supported on a vertical support bracket 75, in turn supported on intermediate plate 71. The output shaft of motor M–1 connects to a commercial type clutch-brake assembly 76, the elements of which are separately actuated, and which in turn is connected to a torque limiting gear reducer assembly 77. The output shaft of gear reducer 77 is connected via coupling 78 to main drive shaft 79 connecting through turret indexing mechanism 110 to a beveled cam drive gear 80. The cam drive gear 80 meshes with bevel gear 83 secured with pinion 84 on a common shaft 85 bearing mounted in housing 82 attached to the end of indexing mechanism 110. Pinion 84 meshes with idler gear 92 which in turn meshes with cam drive gear 81 adapted to rotate cam 86.

The cam 86 is secured to a cam mounting hub 87 having a shaft 88 supported for rotation in ball-bearings 89 and 90, the outer races of which are supported in bracket assembly 91 having a mounting flange 93 secured to intermediate plate 71. Cam 86 is of the plate or disk type having follower grooves 95 and 96 for actuating cam followers 104, 105, 106 and 107.

The cam followers are supported directly below the cam on bottom plate 72 as part of the actuating drive mechanism 103. Cam followers 104, 105 and 107 ride in cam groove 96, while follower 106 rides in cam groove 95. Each of the followers effect the necessary time related motions for operation of their respective stations of which cam follower 104 operates the plate loading and discharge mechanisms at stations 1 and 7, respectively, follower 105 operates the cleaning mechanism at station 2, follower 106 connects to the toner applicator mechanism at station 4, and follower 107 operates the cleaning mechanism at station 6 as more particularly described below.

Figure 15:
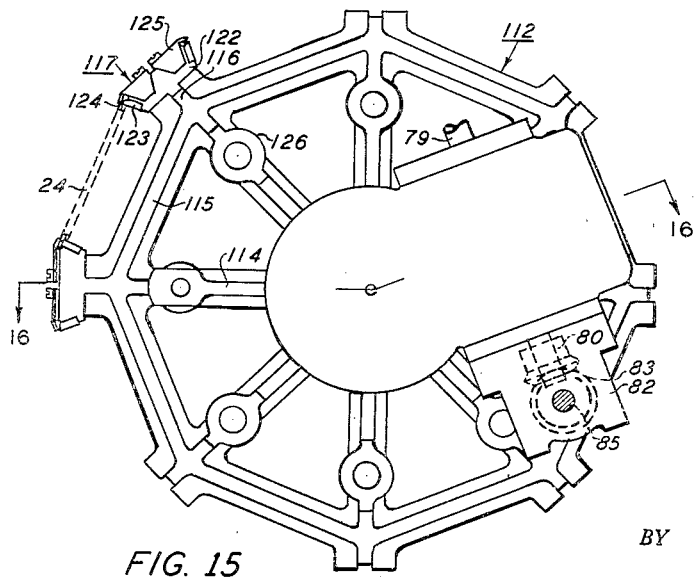
FIG. 15 is a bottom view looking upward at the turret mechanism.

Connected for rotation on indexing mechanism 110 is the turret designated 112. The indexing mechanism is adapted to index the turret through a predetermined angular distance of approximately 45 degrees each time the clutch and brake portion of unit 76 are sequentially actuated. The turret includes eight rib or spoke sections 114 extending radially outward from the center hub 113, which ribs substantially at their outer extremities are joined by an intermediate support rib 115. Cast integrally and substantially at the end of each radial rib is a perpendicularly rising support bracket 116 for supporting a retaining clamp or receiver 117. Each clamp is secured to bracket 116 by means of an insert block 122. On each side of the block, there is a movably positioned insert 123 having a recessed shoulder portion 124. Pivotably mounted and spring urged on the front of the block are two resiliently held clips 125 having a lip portion spaced from and extending transversely across and beyond the shoulder of insert 123. As can be seen in FIG. 15, an image plate 24 is supported with its opposite side rails retained between clips and their respective inserts of adjacent clamps. While in this arrangement, image plates are supported only along the rail edges being accessible from both the front and rear for the cleaning operations of stations 2 and 6, respectively.

Each radial rib 114 contains a bossed insert bushing 126 drilled to accommodate a plate rejection pin 127 slideably supported for actuating microswitches in spaced sequences as will be described. The rejection pins 127 consist of a cylindrical shank 130 supported for reciprocally sliding within insert 126. The head of the shank is drilled to accommodate a plunger pin 131 which is acted upon by plunger 132 of solenoid SOL–1. The action of SOL–1 when energized causes the plate rejection pins 127 to be depressed in the position illustrated in FIG. 16. In its depressed position, the plate rejection pin actuates microswitches S–5, S–6 and S–7 and remains in depressed position until passing over a cam plunger return ramp 134 on leaving station 4. On passing over this ramp, the rejection pins are elevated to inactivate position where they remain until again depressed by the action of SOL–1.

The apparatus of station 1 will now be described with particular reference to FIGS. 1, 8, 13 and 20 to 23. At station 1, the transport turret is designed to remove image plates from the input magazine and insert them into the retaining clamps on the transport turret as the clamps are indexed to this station. The image plate supply magazine being spring-loaded automatically feeds the image plates to the turret loading mechanism until empty. Feeding continues until approximately 70 seconds after the last plate has been loaded from the magazine at which time the "magazine ready" light comes on and remains on until the empty magazine is replaced with one containing a supply of image plates.

The loading mechanism of station 1 operates after each indexing of the transport turret, assuming no rejected image plate was at station 8 prior to indexing as will be understood. A rejected image plate at station 8 causes the control system to disengage the loading mechanism upon the next indexing of the transport turret. This action is controlled by the plate rejection pin 127 on the turret which trips a control switch at station 1. The plunger is depressed by SOL–1 at station 6 upon plate rejection, and remains in the depressed position until it is indexed to station 4 where it is caused to ride return ramp 134 to its normal position.

With the input magazine positioned against stopbar 140 and with the magazine retaining dogs released as aforesaid, the first plate is urged out of the magazine against a plate guide 160 which positions the plate vertically aligned below a reciprocably movable knife 161. With each downward movement of the knife, a plate in position against the plate guide 160 is forced downward through a pair of oppositely supported plate guides 172 into the turret clamp indexed into the plane of knife movement. The knife then is retracted upwardly until above the magazine permitting a subsequent advancement of the next image plate against the plate guide 160.

Operation of the knife emanates from the movement of cam follower 104 slideably supported on two parallel rods 165 and 166 and operatively connected to shaft 167. The shaft 167 is directly movable in conjunction with movement of the follower and is connected in turn to a motion amplifying gear box drive 168. Vertical shaft 170 represents the drive output of the gear box which shaft rotates with an oscillating motion caused by the reciprocating movement of shaft 167. That is, the direction of rotation of shaft 170 is a function of the direction of movement of shaft 167 being that as shaft 167 advances inwardly towards the drive, shaft 170 rotates in one direction while with shaft 167 withdrawing from the drive, shaft 170 rotates in the opposite direction.

Shaft 170 furnishes the drive motion for both station 1 and station 7, the latter receiving its drive motion from a bevel gear 171 secured to the shaft 170. At station 1, the shaft connects through a clutch-brake assembly 175, having an output shaft 176 journaled for rotation in bearing 184 and to which are secured spur gears 177 and 178. The spur gears mesh with vertical racks 179 and 180 which are integrally a part of knife support plate 181 to which knife 161 is secured. As the gears are caused to rotate, the support plate is caused to ride vertically over guide rods 182 and 183 by means of journal supports 190 and 191 secured to the support plate on one side and a floating bearing 192 secured on the opposite side.

Shaft 170 contains a universal coupling 194 and a spool 195 on which is wound a cable 196 connected to a backlash spring 197. As the support plate advances vertically, it moves relative to a stationary frame 202 secured to top plate 70. Mounted on top of the frame is a closely coiled negator spring 203 which is connected to support plate 181 in a manner such that the knife on its descent and ascent does so with a uniformity of velocity and force. On the top of frame 202, there is also a knife interlock solenoid switch S-23 which is operatively timed to the clutch-brake assembly 175 as will be described. Also supported towards the top of the frame is a friction shoe 208 mounted on the end of a leaf spring 209 secured to the frame. The friction shoe bears against lockpad 210 secured to the knife to assist in maintaining the knife in the up position. Also mounted on the frame is a switch S-4 being an interlock for the knife position as will be understood and which is actuated by an actuator 209 mounted on support frame 181 such that the switch S-4 is released as actuator 209 descends and is again engaged as actuator 209 reaches a predetermined position in its ascent.

By means thereof, station 1 provides a series of time related operations effective after the turret 112 has been indexed into position for loading. As the turret is indexed into this position, the knife 161 descends forcing an image plate positioned against the plate guide through a pair of guides 172 onto the turret retaining clamps 117 after which the knife ascends where it remains until the next indexing of the turret. After an image plate has been loaded onto the turret at station 1, the turret indexes the received plate to station 2 approximately two seconds after the start of the next cycle.

At station 2, the image plate is cleaned of previously applied toner particles (as from previous utilization of the same plates) preparatory for re-application or a new application of a uniform layer of toner on the image plate surface. Cleaning is effected by means of a front cleaner assembly 215 as will now be described with reference to FIGS. 3, 8, 13, 14 and 24 to 26. Cleaning is effected by means of an application of vacuum advanced over the image plate surface as provided by vacuum cleaner 17.

The cleaner assembly includes a movable section normally supported in its downmost position to which it descends after each cleaning operation before a turret has indexed a plate to station 2. As illustrated in FIGS. 24 to 26, the movable section is shown in its uppermost position. The assembly is comprised of a main mounting casting 216 having mounting flanges 217 and 218 for being secured on intermediate plate 71. The casting provides a base for a vacuum housing 219 having side journals 220, 221 and 222 that are adapted to slide over vertical guide rods 223 and 224 secured in the casting.

Movement of the vacuum housing is effected by means of a rocker arm 225 pivotably secured at its upper end to a flange bracket 226. At its lower end, the rocker arm is connected through a linkage 230 to a link arm 231 having its rearward end secured to a rod 232 journaled for oscillating rotation effected by means of movement of cam follower 105. The follower 105 is slideably mounted on two parallel bars 236 and 237 and as cam 86 is rotated, follower 105 is caused first to move in one direction and then in the opposite direction sliding across bars 236 and 237. This has the effect of causing rocker arm 225 to rise and fall to advance the vacuum housing first up and then down and move a cleaner nozzle 243 across the image plate surface.

Vacuum is connected to the vacuum housing via a flexible hose connection 240 which connects to a vacuum duct 241 opening into the vacuum housing 219. From the housing, vacuum extends up through a chamber 242 to nozzle 243 which is maintained uniformly spaced to the front side of the image plate by means of a spacer shoe 244. As the nozzle is moved vertically across the plate surface, the spacer shoe moves along the turret face whereby uniform spacing is maintained. A nozzle pivot 245 is provided to permit movement of nozzle to accommodate various thicknesses of plates. A nozzle control ramp 246 serves to retain the nozzle in position when the nozzle advances off the turret. A plate retainer section 247 secured to the underside of plate 70 serves to restrain the plate from moving as the nozzle traverses across the plate surface. Near the bottom of the assembly, there is provided an interlock switch S-2 which is actuated by a switch actuator 248 contained on the vacuum housing 219.

By means of front cleaner assembly 215, the front surface of image plate 24 is completely vacuumed preparatory for application of electroscopic toner particles. In connection with station 2, there is provided a cam ramp 249 located on the front frame. This ramp is positioned at the approach to station 2 such that its trailing edge clears the lowest point of each image plate in clamp 117 on the turret. The function of this ramp is to properly position the image plates in the turret as they enter station 2 for the cleaning operation.

After the cleaning operation of station 2, the turret 112, containing a previously vacuumed plate, indexes the plate to station 3 where at detection of the presence or absence of an image plate in the transport turret is ascertained. This determination is important in order to anticipate properly the toning operation to occur at station 4 which is the next indexing of the transport turret. The presence of an image plate at station 3 after turret indexing programs the apparatus of station 4 for the toning operation on a subsequent indexing of the turret. If an absence of a plate is ascertained at station 3, the toning operation at station 4 is withheld on subsequent turret indexing.

Detection at station 3 determines the presence or absence of a plate. The plate is first aligned by means of a cam ramp 260 located on the inner frame at station 3. This ramp is positioned at the highest approach to station 3 and its trailing edge clears the highest point of each image plate clamp 117 of the turret. The function of this ramp is to properly position the image plates in the turret so that they trip microswitch S-11 and thus accomplish the operation described above.

Figures 13, 14:
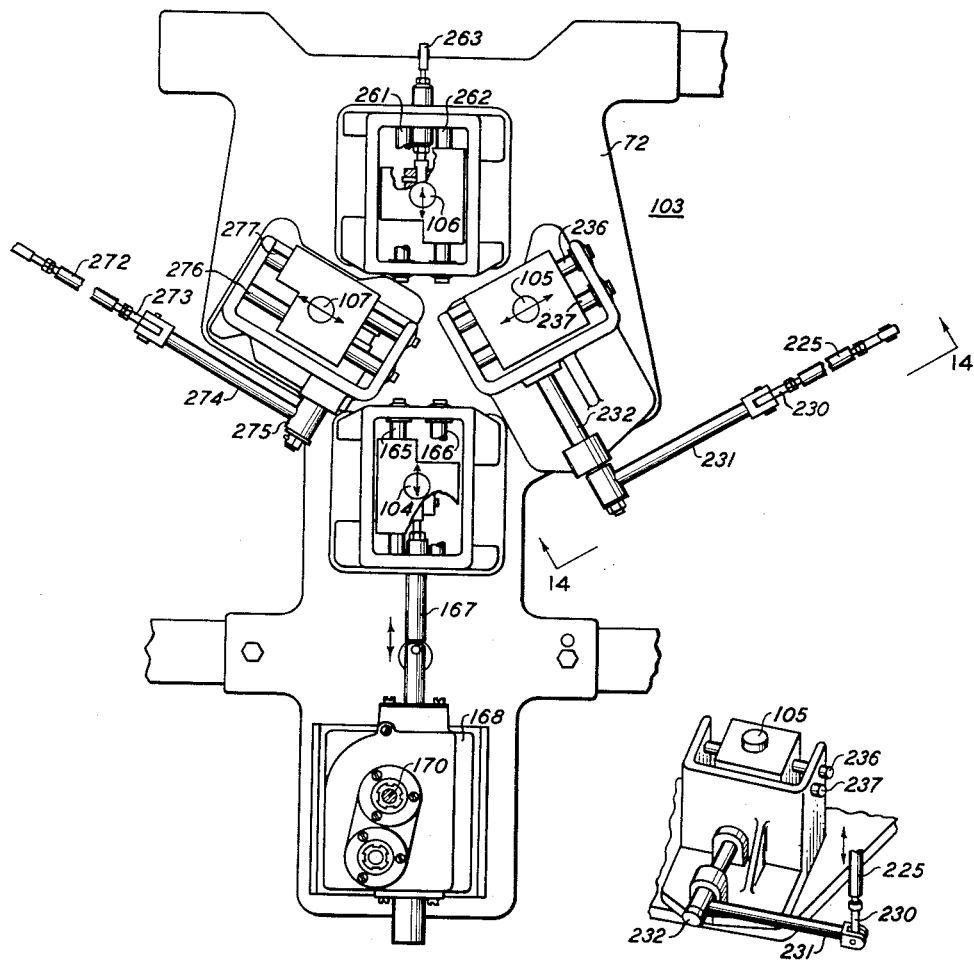
FIG. 13 is a plan view of the actuating drive mechanism.
FIG. 14 is a fragmentary view viewed from the position 14—14 of FIG. 13.
Figure 16:
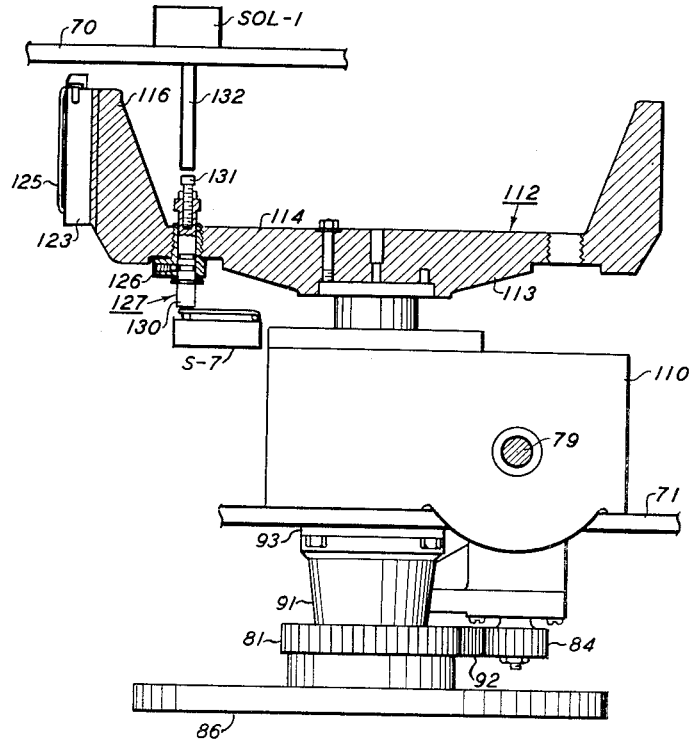
FIG. 16 is a sectional view taken substantially along lines 16—16 of FIG. 15.
Figure 27:
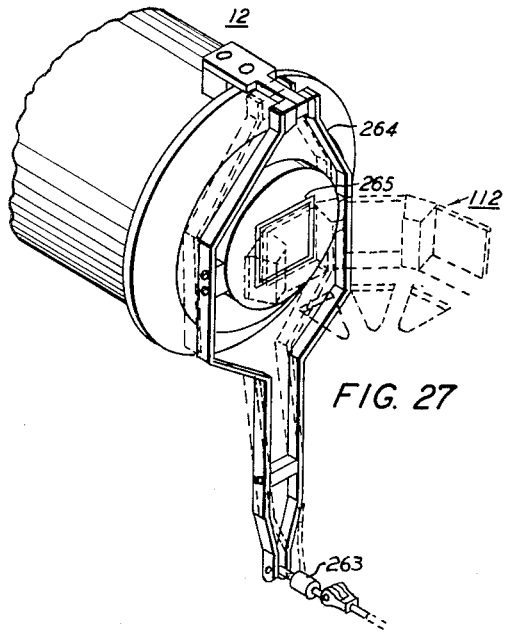
FIG. 27 is a fragmentary isometric view illustrating the masking of an image plate to the toner applicator unit at station 4.
Figure 38:
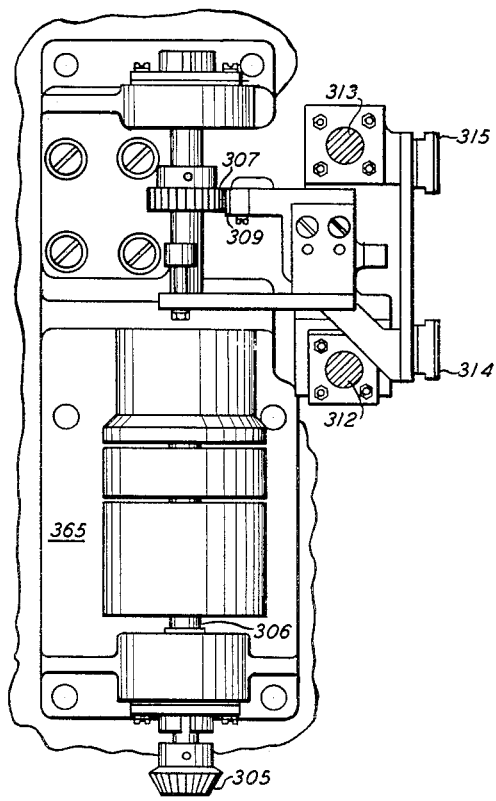
FIG. 38 is a plan view substantially at the level 38—38 of FIG. 36.

After the determination has been made at station 3 as aforesaid, the turret 112 is then indexed to station 4 at which electroscopic powder is uniformly applied onto the conductive face of the image plate. As before when the transport turret completes the index of an image plate, the clutch of unit 76 is engaged while the brake of the same unit is released causing the cam to rotate. As the cam rotates, follower 106 is caused to be slideably advanced across a pair of slide bars 261 and 262 (FIG. 13). As the follower moves with the pitch of the cam, a bell crank type of linkage 263 is driven and a yoke 264 (FIG. 27) at the upper end of the linkage moves an applicator mask 265 of toning applicator 12 forward into position until sealing against the image plate.

The toning applicator of the apparatus is more fully described in copending application entitled "Powder Charging and Applicator Apparatus," Serial No. 173,015, filed concurrently herewith in the name of Carl B. Kaiser. Briefly, as described in that application, the toner application sprays an image plate with electroscopic powder which is charged prior to said application by means of controlled friction. An aerosol of toner is supplied to the toner applicator from a toner dispenser generator 11 which is substantially of a type described in copending application Serial No. 110,805, filed May 17, 1961, in the name of Carl B. Kaiser. The dispenser generator is a dual-function device which meters a desired amount of toner and mixes it with pressurized air for delivery to the toner applicator. A supply of toner is contained in the dispenser generator and is sifted and dispensed in regulated amounts, blended into a pressurized stream of air and then delivered as an aerosol mixture to the toner applicator.

Suitable controls are provided within the generator apparatus whereby dispensing is uniformly effected and signals are provided to indicate malfunction or when the toner supply has become exhausted.

The toner composition may be of a commercially marketable type consisting of pigmented resin particles of largely polystyrene. The exact toner composition employed in the particular process may be of varying chemical composition depending on the ultimate utilization of the plate to which the toner is to be applied. Thus, the composition may consist largely of polystyrene resin in combination with the coloring material. It may also contain magnetic particles in combination with a rosin modified phenol formaldehyde polymer and a percentage of polyvinyl butyral. Various electroscopic powders are commercially marketed for utilization such as those marketed for the electrostatic process of xerography.

The aerosol mixture in the applicator is directed by means of a nozzle against a rotating charging disk from which the aerosol is deflected at a predetermined angle towards an image plate supported at the opening of the mask. The impact of the toner being ricocheted off the charging disk causes the toner particles to assume a triboelectric charge of predetermined polarity. The nozzle and charging disk simultaneously revolve causing the toner particles to be sprayed in an even pattern over the face of the image plate supported at the mask. During application, the image plate is maintained at ground potential such that electrostatic attraction of relatively high order results between the image plate and the toner particles causing the toner particles to adhere firmly to the image plate.

Upon completion of the toning operation, the main drive cam 86 is again operated and the linkage 263 is drawn in an opposite direction to retract the applicator mask. This permits unimpeded indexing of the turret.

Following the application of toner at station 4, and with the mask retracted, the turret 112 is indexed again to station 5 whereat the ascertainment of the presence or absence of an image plate is again effected similarly as at station 3. Upon determination, the appropriate control for operation of operation of station 6 is anticipated. Thus, station 5 serves to notify a memory circuit of the presence or absence of an image plate, and in accordance with this intelligence, the inspection operation of station 6 is programed or withheld when the subsequent indexing of the transport turret occurs. A cam ramp 266, located at this station, has a similar effect as described in connection with cam ramp 260 above. After determining the presence or absence of an image plate at station 5, the turret is again indexed to place an image plate on the turret, if present, at station 6.

Station 6 performs a multiple operation. As the transport turret completes indexing, a cleaning operation is effected by means of a rear cleaning assembly 270 adapted to clean or remove dust or toner from the untreated back side of the image plate, or the side opposite to that cleaned at station 2. On completion of the latter cleaning operation (assuming the presence of an image plate), the inspection operation takes place by means of a toning density detector 14. In the absence of a plate, the inspection does not take place.

The rear cleaning assembly 270 is generally similar to the front cleaning assembly 215 described above and reference is made to FIGS. 8, 13 and 30 to 32, inclusive. Basically, the difference between the cleaning assemblies at stations 6 and 2 is in their physical arrangement rather than in the particular elements employed. In exception to this last statement, the rear assembly 270 includes a spacing roller 271 employed to roll over the rear glass surface in order to maintain an established clearance between the vacuum cleaner nozzle 243 and the image plate surface to be cleaned.

Operation of the cleaner assembly is effected similarly as in station 2, but being actuated by cam follower 107 which is slideably supported on slide bars 276 and 277. Similarly, a rocker arm 272 is connected to a linkage 273 in turn connected to a link arm 274 which is secured to an oscillating rod 275, caused to oscillate by movement of the follower. Cleaning of the plate surface is effected as the vacuum nozzle makes two passes over the plate surface. After cleaning, the density of the previously applied toner is determined by means of toning density detector 14. A plate retainer bar 250 serves to restrain the plate from moving as the nozzle traverses across the plate surface.

Figure 2:
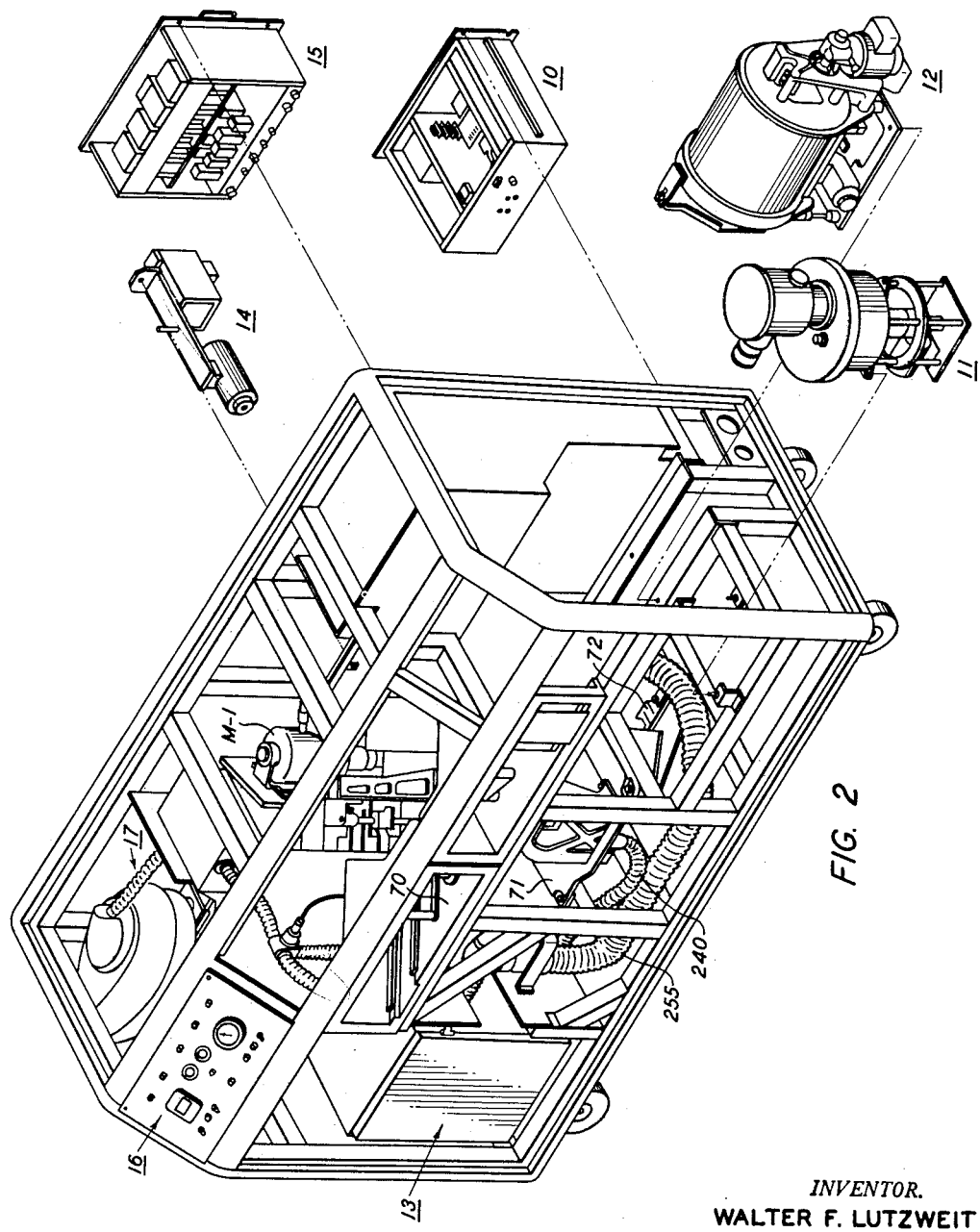
FIG. 2 is an exploded perspective of the apparatus with cover plates removed.
Figure 3:
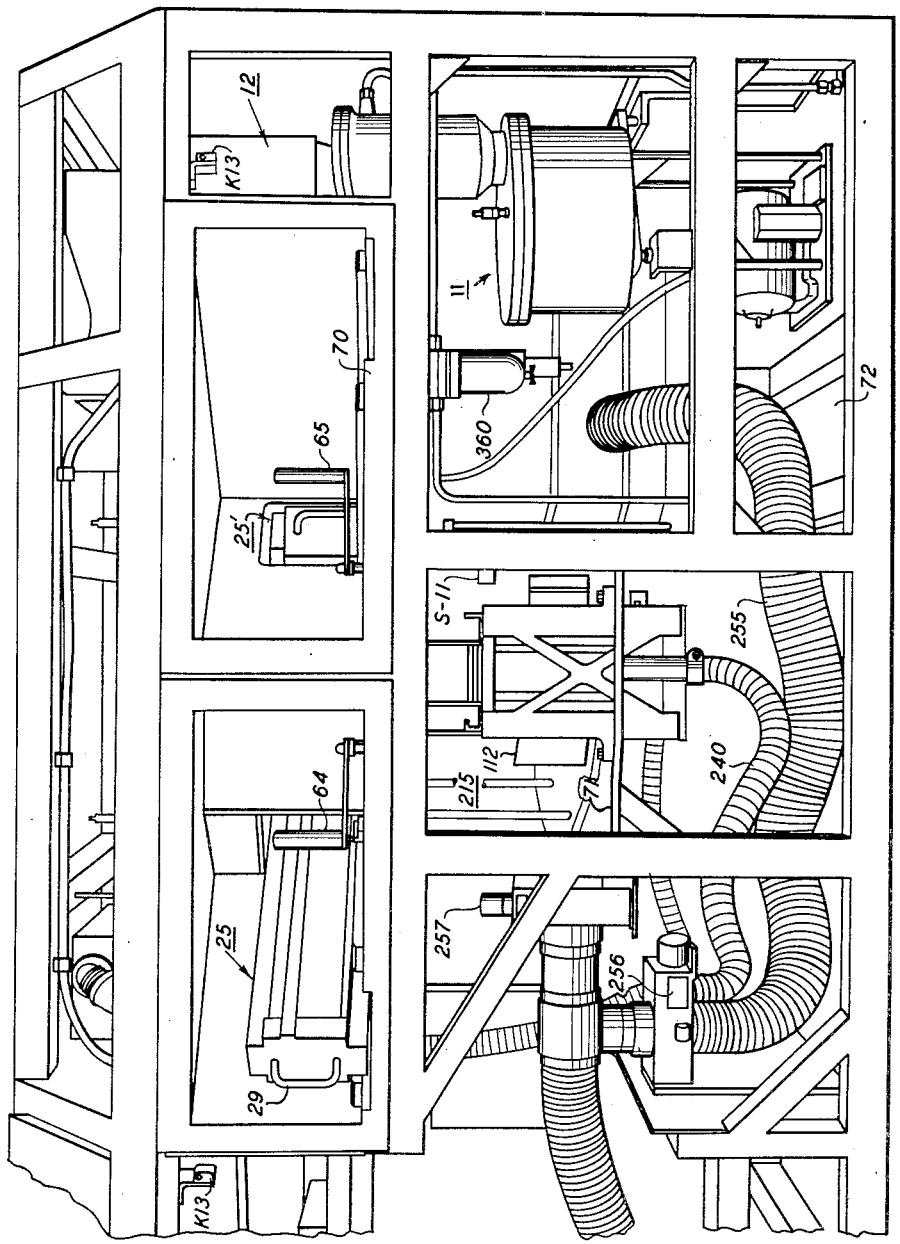
FIG. 3 is a front elevation of the apparatus with the cover plates removed.
Figure 4:
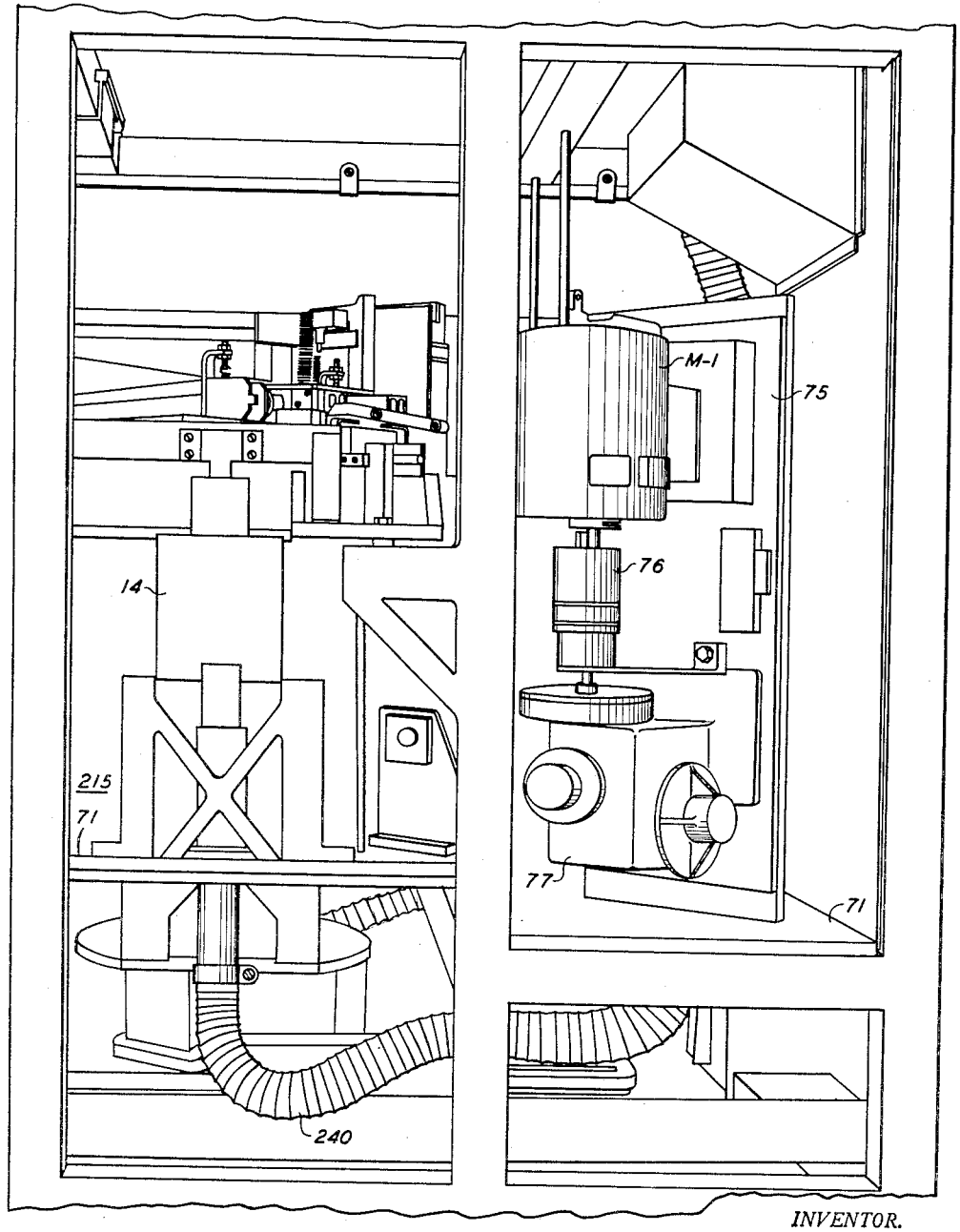
FIG. 4 is an end elevation of the apparatus with the cover plates removed.
Figure 28:
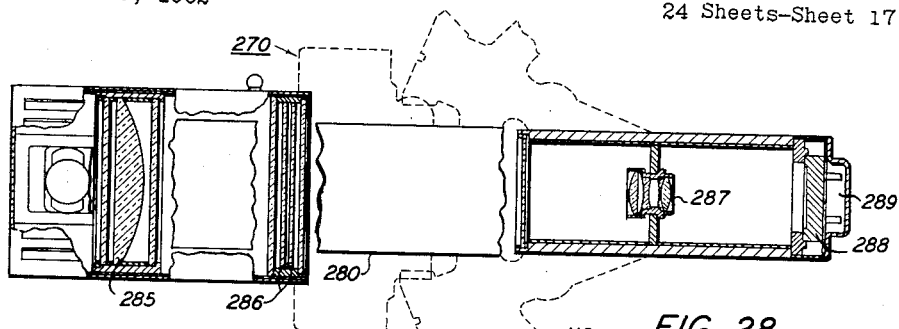
FIG. 28 is a plan top view of the densitometer detector at station 6 partially broken away to facilitate understanding of its structure.
Figure 29:
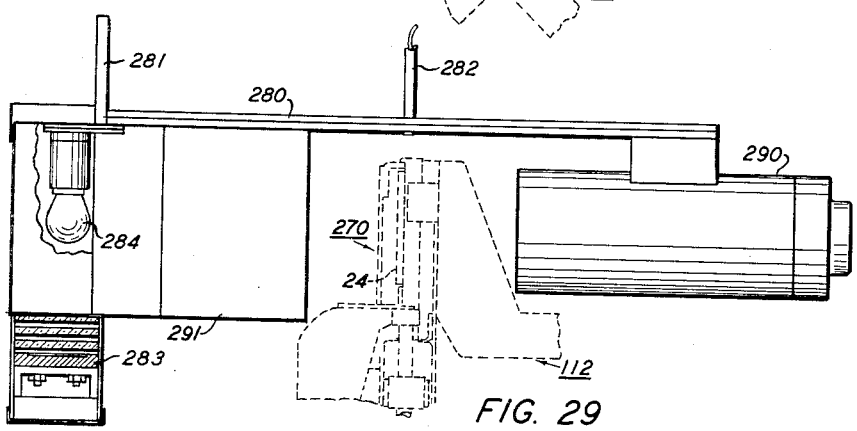
FIG. 29 is a side view of the densitometer detector shown in FIG. 28.

The toning density detector 14 is illustrated in FIGS. 2, 28 and 29 and constitutes an optical device which senses the density of xerographic toner on the image plate under inspection. After ascertaining the density, this information is transmitted in the form of an electrical impulse to densitometer controller 15 for a determination of its value and appropriate action. The density detector includes a horizontal support plate 280 having a mounting plate 281 for mounting the detector in position within the cabinet. The detector is energized via connecting wire 282 and includes a calibrated photocell 283, a light source 284, a condenser lens 285, a light diffuser plate 286, a projection lens 287, an inspection photocell 288 and a terminal connector 289. The elements are appropriately housed in housings 290 and 291 as illustrated. Between housings 290 and 291, there is provided an opening in which turret 112 (shown dashed) indexes an image plate into inspection position.

The density detector operates on mathematical principles being that the relationship of the intensity of incident illumination to the intensity of transmitted illumination defines a light intensity ratio. Since light varies as the cube of the applied voltage, and since light output varies at a constant applied voltage as a function of filament deterioration, the light source of the instrument under discussion is controlled by photocells acting in a servo loop. Thus, photocells 283 and 288 are identical and operated in a "short circuited" mode. Cell 283 is affected to regulate the light source by demanding a constant intensity of incident illumination, while photocell 288 measures the light attenuated by the image plate under inspection.

Power for the light source is supplied by a regulator within the densitometer controller 15. The condenser lens 287 is effective to collect light from the source and focus it on the image plate under inspection. Diffuser plate 286 effects a graduated reduction of the light intensity to a suitable level and distributes the light evenly over the face of the image plate. Light transmitted from the image plate is collected and projected by the lens 287 onto the detecting photocell 288. This latter photocell then transmits an electrical impulse, relative in magnitude to the intensity of light striking its surface to the densitometer controller 15 for measurement and appropriate action.

The densitometer controller is a commercially marketed product of the Monroe Electronic Laboratories of Middleport, New York, being their model 123 adapted to the particular requirements of the instant apparatus. The controller classifies the information received from the density detector unit as being within or outside acceptable limits and actuates reject mechanism circuits for those plates found not within acceptable limits. Thus, the apparatus is effective to measure and indicate the optical density of the toner and the plate under inspection. It provides preset high and low limits of acceptability and automatically, upon command classifies the plate under inspection into one of three following categories: (1) reject-density too high; (2) accept density acceptable; or (3) reject-density too low. If the plate under inspection falls into category 1 or 3 above, it closes an external circuit for automatic handling of the rejected plate. Similarly if the plate under inspection falls into category 2, an appropriate signal is transmitted. For plates meeting inspection requirements, no further operation is performed at station 6. For plate rejected by failing to meet inspection requirements, plate rejection pin 127 in the transport turret is depressed by action of SOL–1 to program the deficient plate for reprocessing, and indicating its presence to the control circuitry. Where reprocessing has been indicated, the plate being rejected will not be discharged at station 7 as will a plate which has been approved on inspection at station 6.

After completing the cleaning and inspection operations at station 6, transport turret 112 is again indexed as aforesaid to place the plate at station 7 whereat a plate approved on inspection will be stripped from the transport turret and discharged or loaded into the output magazine.

The apparatus of station 7 will now be described with particular reference to FIGS. 7, 8, 13, 21 and 33 to 38. As stated above in connection with the operation of station 1, station 7 is operative in timed relation to station 1 by means of a bevel gear 171 secured to oscillating shaft 170. Meshing with gear 171 is a bevel gear 305 supported on a shaft 306 to which is secured a spur gear 307. The spur gear is effective to drive rack 309 which is integrally a part of support plate 311 causing the support plate to be moved vertically over guide rods 312 and 313. On the rearward side of support plate 311 is a pair of knife members 314 and 315 aligned vertically below an image plate 24 supported in the turret 112. The knife has a flat top portion 320 which when moved upward in conjunction with movement of support plate 311 engages the bottom edge of plate 24 forcing it upward from the turret 112 into a plate guide 321 secured to the bottom of top plate 70. As the image plate ascends, it engages a plate retaining dog 322 pivotably supported at pivot 323 causing the dog to be pivoted rearwardly to a position shown dashed in FIG. 36. A spring 325 urges the dog to its normal position such that lip 326 on the dog is supported under the bottom edge of the image plate as the image plate ascends therepast. The image plate continues to ascend past the dog until emerging between a pair of parallel spaced plate guides 324. In this position, the image plate is retained erect by a pair of oppositely supported pivotably mounted horizontal retaining dogs 327. These dogs pivot about a spring-loaded pin 328 which maintains the dogs normally in the position illustrated solid in FIG. 33. As the image plates are fed from this position into the output magazine as will be described, the horizontal retaining dogs are cammed outwardly to a position shown dashed. Maintaining the image plate from its top is a plate retainer 329. This last plate retainer is pivotably mounted about pivot 330 and is spring-loaded by means of spring 331 to normally urge its retaining nose against the top edge of the image plate.

Feeding or stuffing of the image plates into the output magazine is effected by the oscillating motion derived from shaft 170 which is transmitted via spur gear 307 which is caused to oscillate and effect reciprocal movement of support plate 311. Secured on top of plate 311 is a horizontally extending bar 333 on which there is perpendicularly mounted a horizontally extending cam follower 334. Operatively connected to the cam follower is a channel cam 335 that is pivotally mounted on pivot 336 secured in support bracket 337. As the cam follower vertically descends and ascends in accompaniment with support plate 311, the cam is caused to pivot and shift its position as shown in dashed outline of FIG. 36.

The top of the cam 335 includes a bifurcated opening 340 to receive a cross pin 341 connecting two parallel push rods 342 and 343, each journaled for sliding motion and connected at their forward end to a stuffing plate 344. As the support plate 311 is ascending for removing an image plate from the turret into position for loading into the magazine, the cam 335 causes stuffing plate 344 to be withdrawn permitting unimpeded movement of the image plate into discharge position between guides 324. Thereafter as the support plate 311 descends, cam 335 in response to movement of the follower, forces the stuffing plate in a direction toward the open magazine until engaging the rear surface of the image plate in loading position. As movement of the stuffing plate continues, the image plate is forced from its retaining means into the magazine against the opposition of magazine follower plate 42. Each of the retaining means are cammed outwardly as the image plate is forced inwardly of the magazine. Since after the image plate is moved past horizontal dogs 327 they revert to their normal position, their forward edge 350 prevents backfeeding of the previously discharged image plate as the stuffing plate 344 is subsequently withdrawn to permit loading of the next image plate. Push rod 342 is slideably supported in a floating journal 351. A spring 352 secured between rear journal 353 and flange 354 urge the push rods and stuffing plate toward the forward stuffing position. A retainer pin 355 prevents magazine follower plate 42 from being forced beyond a maximum position relative to the loading apparatus. Supported on intermediate plate 71 in operative relation to support plate 311 is an interlock switch S–8 that is actuated by switch actuator 356 secured to the rear of the support plate 311.

Loading of image plates at station 7 is continuous with each indexing of the turret except when the reject signal had been received as aforesaid. Appropriate signals are provided whereby as the output magazine approaches full capacity, an indication of this fact is given to advise need for an imminent displacement. After the image plate has been stripped from the turret, the turret is again indexed to place the just vacated position at station 8 or in the alternative, if the plate had been rejected on inspection at station 6, to place said rejected plate at station 8.

Station 8 is non-functional in the case of a plate accepted by the inspection operation at station 6, since an approved plate will have been stripped from the transport turret at station 7 and loaded into the output magazine. In the case of a plate rejected at station 6 for reprocessing, station 8 performs a dual operation. First it signals the presence of a rejected plate to a memory circuit which energizes the brake while de-energizing the clutch of assembly 175 thereby immobilizing the station 1 loading mechanism on the following indexing of the transport turret. Second, the signal acts, also when rejected plates have been identified at stations 6 and 7 by the plate rejection pin 127, to illuminate a fault light on the control panel and stop the unit after three successive rejections.

Dust or toner removed by the cleaning assemblies at stations 2 and 6 are drawn through flexible tubing or hose 240, (FIGS. 2 and 3) by means of vacuum generated by vacuum cleaner assembly 17. The vacuum cleaner is a standard commercial type, developing a high vacuum relatively low in volume.

Also connected to the vacuum cleaner is dust collector 13 which through hose 255 removes, from the toner applicator, all xerographic toner which is residual to the actual plate toning process. Dust collector 13 is a continually operative high volume type, having a high collection efficiency and according a pressure drop in the order of approximately three inches of water. Hose 255 connects to the dust collector via two independently operated solenoid actuated butterfly valves 256 and 257. Control of the valves is by means of a program timer not shown, and are operative such that valve 257 opens to atmosphere when the applicator is not in use and 256 is closed. With the applicator in use, 256 is open and 257 is closed.

Power supply 10, for use in conjunction with the described embodiment, receives 120 volts, single phase 60 cycle A.C. from a convenient outside supply transforming it to 28 volts, rectifying it to D.C., and regulating it at a stable level under changing load conditions. The output of the power supply operates the magnetic clutches, brakes, control solenoids and relays, and the various control panel lights.

Figure 39:
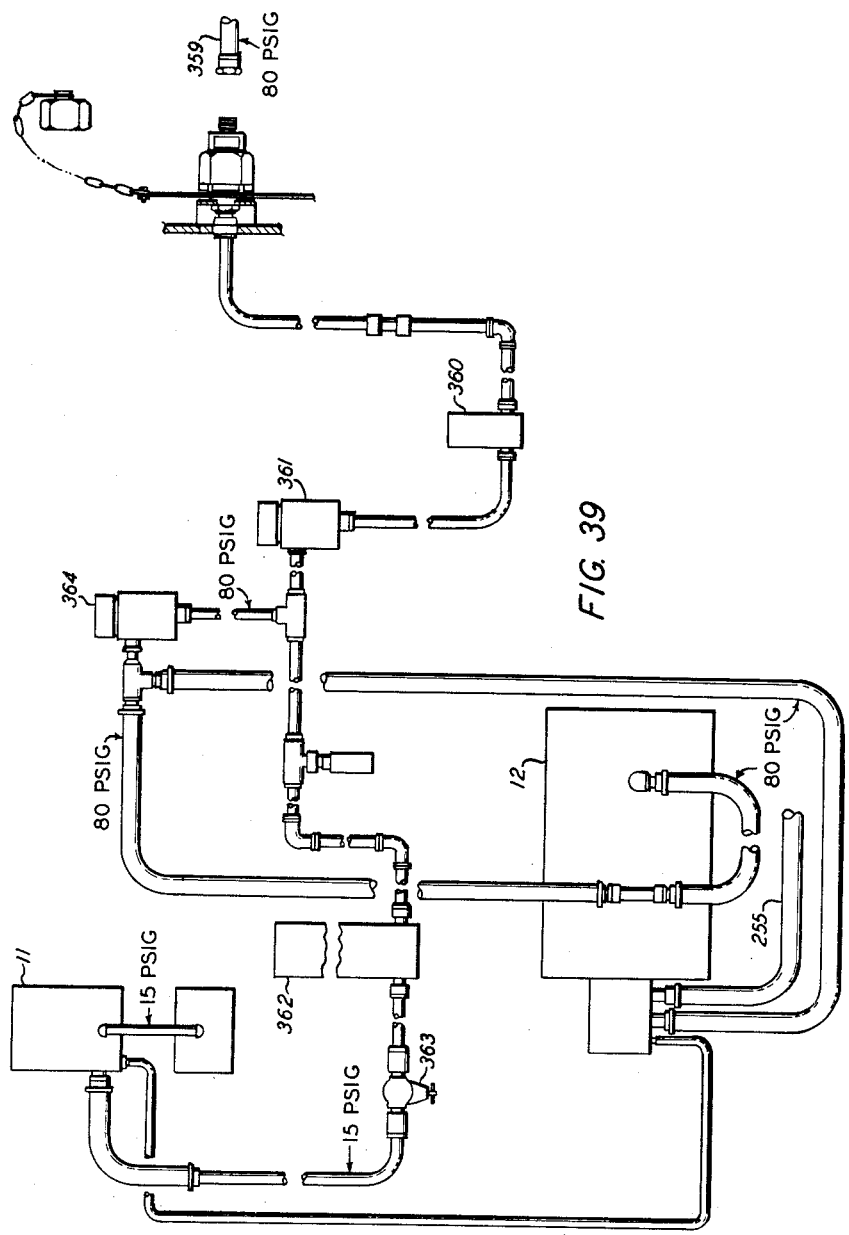
FIG. 39 is a schematic piping diagram for the compressed air system of the apparatus.
Figure 40:
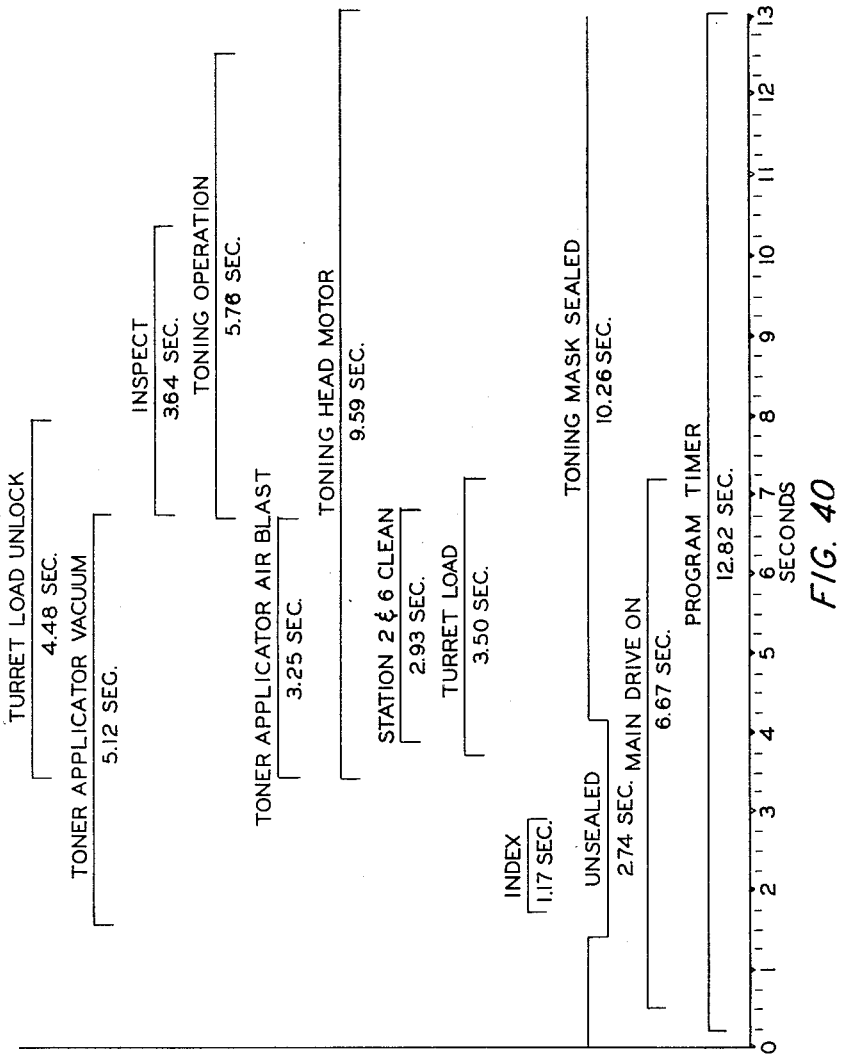
FIG. 40 is an operating cycle timing diagram.

FIG. 39 schematically illustrates the compressed air piping as utilized within the apparatus. Briefly, the air enters in conduit 359 at approximately 80 p.s.i.g., passing first through an air filter 360 to a main air shutoff solenoid valve 361. From there, the air branches off first through a desicator 362 through an air regulator 363 into dispenser generator 11. Secondly, the air branches off from the main air shutoff solenoid valve to the toner applicator air blast control solenoid 364 which discharges the air to two separate locations in the toner applicator 12.

Figure 41:
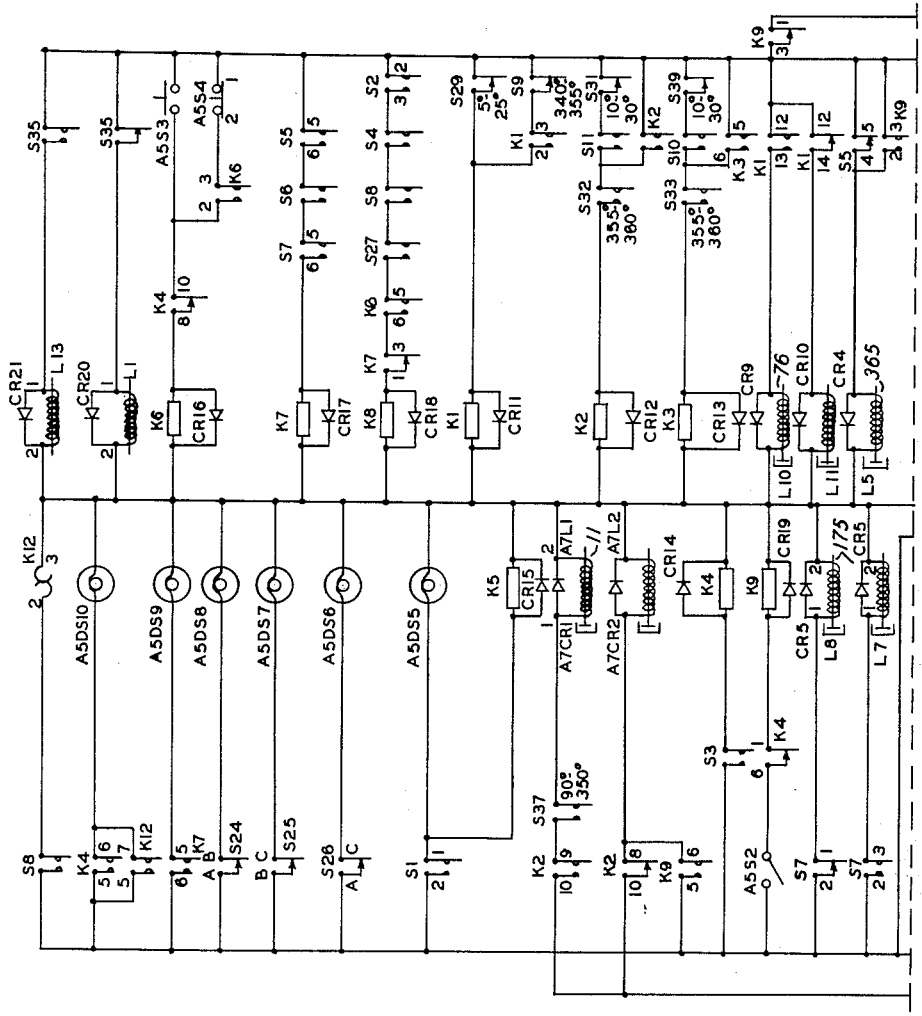
FIGS. 41 and 42 are schematic electric circuit diagrams.
Figure 42:
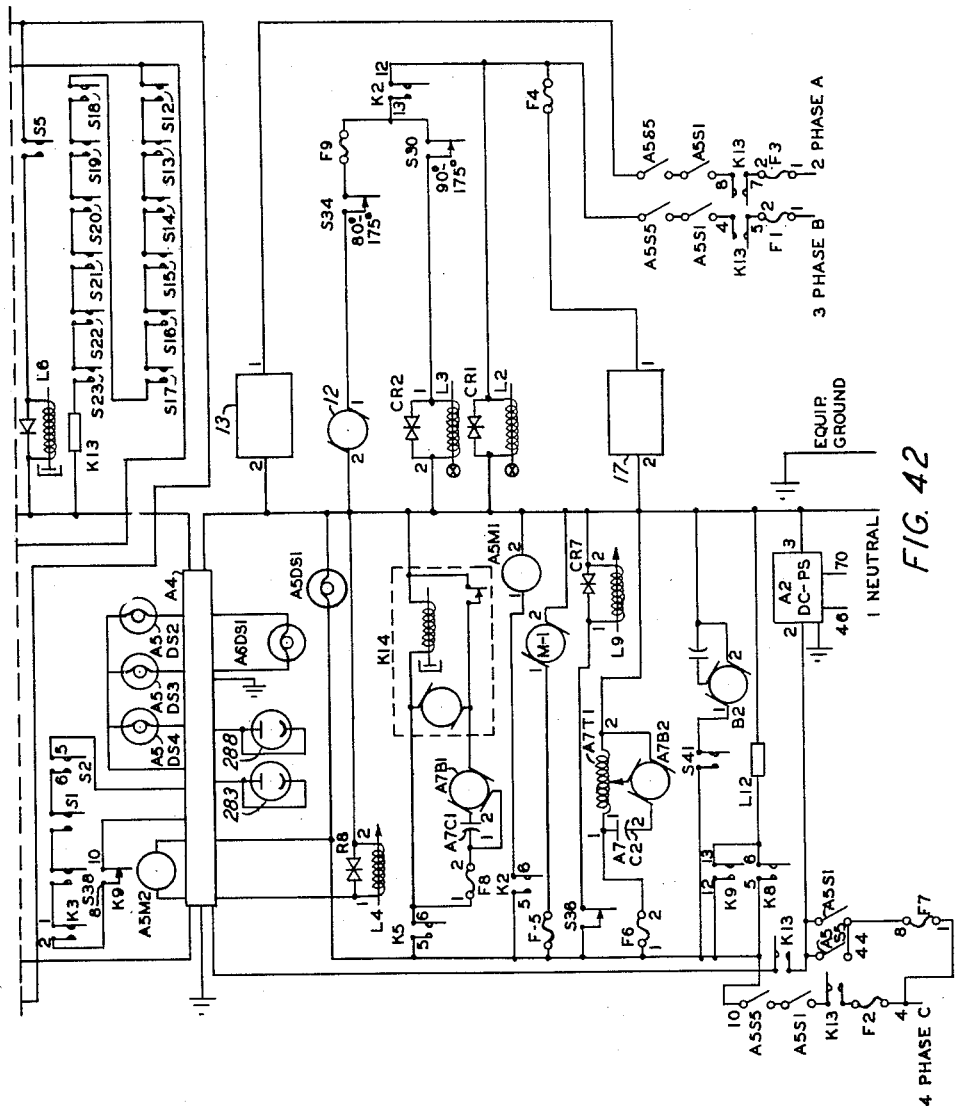

FIGS. 41 and 42 constitute connecting electrical diagrams for the apparatus. This includes various on-off switches and time delays to insure proper operating conditions before commencing operation of the instant apparatus. By means of a program timer, various relays and contacts are energized before the mechanical operations.

Electrical operation of the unit assuming the transport turret is empty and both magazines are in place is as follows.

The D.C. power switch A5S1 is placed in the "On" position and energizes the D.C. power supply A2. Through a parallel circuit, A.C. power is supplied to the densitometer controller 15, starting its warm up operation. After short interruptions, approximately one minute is allowed to elapse before the A.C. power switch A5S5 is thrown. For "cold" starts, approximately 30 minutes are required. This waiting period prevents premature operation of the inspection station SOL–1 and allows time for the following components to energize. (A) Main drive system brake L11 of assembly 76; (B) output magazine loading clutch L5 of assembly 365; (C) panel and door interlock relay K13; (D) toning generator assembly brake A7L2; (E) input magazine stripping or turret loading clutch L8 of assembly 175; (F) toner pressure light A5DS6; (G) cleaner pressure light A5DS7; (H) air pressure light A5DS8.

When the A.C. power switch A5S5 is placed in the "On" positioning of the various events occur simultaneously, including energizing of main drive motor M–1, the motor of vacuum cleaner 17 and the motor on the dispenser generator until 11. Also energized are turret loading interlock solenoid switch S–28 and main air shut off solenoid 361. The A.C. power light comes on, and air pressure, cleaner pressure and toner pressure lights go off. The machine is now in "stand by" condition. After a 30 minute warm up time for the densitometric controller 15 has elapsed, the start button switch A5–S3 may be depressed. For a normal cycle of operation the depressing of the start switch A5–S3 initiates a sequence of events, including energizing the K6 relay held in by its own contacts #2 and #3. The #5 and #6 contacts on K6 are closed, through which K8 relay is energized because the switches plate cleaning S–2, turret load interlock S–4, magazine load interlock S–8 and turret index S–27 are closed and the K7 relay is not energized.

When relay K8 operates, power is applied to the electromagnet L12 on a program timer 22B2. This action starts the timer motor B2 and begins the apparatus cycle of operation. When the program timer cam line reaches 5°, switch S–29 closes and energizes relay K1. At 25° of the timer cam line, S–29 opens but K1 remains energized through contacts #2 and #3 and the normally closed contacts on cam switch S–9 on the main drive system. Contacts #12 and #14 on K1 open and remove power from the brake L11 of assembly 76 and contacts #12 and #13 apply power to the main drive system clutch L10 of assembly 76. This sequence transmits torque to the large driving cam 86 starting the mechanical motions of the apparatus.

At 10° of the timer, cam line S–31 and S–39 close. However, K2 and K3 will not energize because there are no plates at station 3 or station 5 position at this time. When a plate is in position at station 3 (4 cycles later), S11 will be closed and with the closure of S–31, K2 relay will energize. K2 holds through its contact #3 and #2. This holding circuit is broken by S–32 just before the program timer completes its cycle of operation. The operation of K3 relay is the same with S–10, the plate sensing switch for station 5, and S–33 the circuit breaking switch. These memory circuits must be stabilized, that is, S–31 opens for K2 circuit and S–38 opens for K3 circuit before the transport turret performs its index. Approximately ½ second is allowed for this sensing action and this is of the order of time taken to unseal the mask. Both of these actions occur simultaneously.

When K2 relay is energized the toning disk hour meter A5M1 times because contacts #6 and #5 are closed. Also contacts #12 and #13 are closed and power is available for the toner applicator motor A1B1 to operate through its time control switch S–34. Power is available through the same relay contacts to SOL–364 through its time control switch S–30. This solenoid controls the flow of purging air used to clean the plate mask. Both cams on the program timer that control S–34 and S–30 are adjusted to operate after the K2 relay because its contacts could be damaged.

The dispenser generator 11 is programed through contacts #8, #10, and #9 of K2 relay.

The transport turret 112 commences its index after the toner applicator unit 12 is unsealed. During this indexing which takes approximately 1.2 sec., the program timer does not energize any circuits. K8 relay is de-energized because S–27 is de-actuated during the indexing of the transport turret. This has no effect on the program timer in as much as its control switch S–41 is mechanically actuated until the end of the timer cycle. Also, S–1 is de-actuated during indexing. However, this switch is in the "density check command" circuit and this instruction is not given until after the cleaning operation.

Station 3 sensing switch S–11 and station 5 sensing switch S–10 may be actuated during transport turret indexing but this action does not affect the memory relays because S–31 and S–39 on the program timer are open.

After the indexing is completed, station 4 is then sealed and the program timer has approximately 10 seconds remaining to control the toning operation. This consists of purging the mask, shunting vacuum to the applicator, energizing the clutch that controls the dispenser generator drive, and powering the toning applicator drive motor A1B1 through S–34. Program timer cam switch S–37 is the controller for the generator clutch, provided of course that the memory relay K2 was energized and its contacts #9 and #10 are closed. The brake on the generator drive is off for a short period of time before this clutch is energized.

During the toning cycle at station 4, the plate cleaning cycle has started at stations 2 and 6, even if these stations are empty. These motions open S–2 cleaning switch at station 2 and K8 is de-energized, but as explained above, this does not affect the program timer. The other pole of this switch is connected in series with the "density check command" circuit and must be closed before the command to the densitometric controller can be sent through S–38. Switch S–2 assures that the cleaning head at station 6 does not obstruct the inspection light.

The turret loading cycle occurs at approximately the same time as the cleaning operation. This motion occurs at station 1 provided there is not a rejected plate on the turret at this station. If there is a rejected plate on the turret at station 1, switch S–7 is actuated at station 8. This results in power being switched from the clutch to the brake and disables the loading mechanism. This situation remains until a subsequent indexing of the transport turret. At this time, if the situation is normal, the turret will be empty at station 1 and S–7 will be de-actuated, with power again applied to the clutch and removed from the brake.

A similar circuit exists and controls the action at station 7 during this same period of time. If a rejected plate is not in station 7, switch S–5 is not actuated and the turret stripping cycle occurs. If a processed plate is in this station, it will be loaded into the output magazine. If a rejected plate is in station 7, the converse is true because of the action of S–5 actuated at station 7. Whenever rejected plates are present at stations 1 and 7, the other poles of these switches are connected in series to memory relay K7. The closure of two of these switches will not energize this relay. However, if a rejected plate is simultaneously in station 8, the relay is energized and a density fault light is illuminated while the program timer stops after completion of its cycle. The turret must then be emptied by placing the "empty" switch on the "on" position before normal operation can continue.

Upon completion of the cleaning and stripping operation approximately six seconds remain on the program timer cycle. During this timer cam switch S38 closes and calls for an inspection of the plate in station 6. The circuit is completed when K3 memory relay was energized and contact #3 and #2 are closed. When the inspection is made, the results are observable at the control panel for approximately 1 second. A direct density reading may be recorded from the image plate density meter A5M2. In addition, if the results of the inspection call for a rejected plate, solenoid SOL–1 is energized. This solenoid moves pin 127 into position so that the rejected plate is identified until it is reprocessed and inspected. Visual indicators are also available. In case of rejected plates, they are yellow panel lights. If the inspection showed too low density, A5DS3 light is illuminated. If the density was too high, light A5DS2 will operate. The lights remain on until the end of the program timer cycle when K3 memory relay is released.

In the event of failure of the apparatus to dust a plate above a predetermined density, the high density light and the overload light A5DS4 would operate at the same time. Low density light A5DS3 operates if too low a density is measured.

During the above period of time, the cam switch on the input side of the transport turret precision indexer is pulsed. This action breaks the holding circuit of K1 relay and contacts #12 and #13 open and remove power from the main drive clutch. Contacts #12 and #14 apply power to the brake and mechanical motions of the apparatus cease.

The program timer continues out its cycle of operation and as it reaches its home position, the cycle of operation for the apparatus repeats if the following conditions are met.

a. Stop button A5S4 was not depressed. This action would break the holding circuit for K6 relay resulting in open contacts #5 and #6. Thus the K8 relay would drop out and de-energize the electromagnet L12 which controls the program timer motor B2.
b. A rejected plate in stations 7, 8 and 1. This condition energizes K7 relay and opens contacts #3 and #1 affecting the circuit in the same manner as item a, above.
c. Either the plate cleaner, the turret loading mechanism, the magazine loading mechanism or the turret index not completed, or in their respective home positions. Either one or all of sensing switches S–2, S–4, S–8 or S–27 would remain open and affect the circuit as described above in items a and b.

Under normal operation, the apparatus continues to process plates at the rate of one every twelve seconds until the last plate is stripped from the input magazine and loaded onto the turret. At this time, S–28 closes and energizes K12 time delay relay. This relay actuates the magazine ready light A5DS10 after the apparatus has had sufficient time to process the last plate. This light is the signal for the operator to remove the output magazine. This procedure actuates S–3 and stops the program timer at the end of its cycle by de-energizing K6 relay, if the input magazine contained less than 65 plates or if there are rejected plates remaining on the turret. This switch will have been actuated if 65 processed plates were loaded into the output magazine.

The apparatus cannot be cycled as long as switch S–3 is actuated and the magazine ready light is on. When the loaded magazine of processed plates is removed and replaced with an empty magazine, S–3 is released and operation of the unit is possible. The magazine ready light may still remain on because K12 time delay relay is still energized. The power to this relay is removed when a new input magazine is inserted to replace the empty one.

In the event the K7 is energized, which is the case when three rejected plates are in stations 7, 8 and 1, the only way to continue operation of the apparatus is to place the empty switch in the "On" position. This action energizes K9 relay, contacts #10 and #8 prevent the inspections of the plates, contacts #1 and #3 remove power so that the output magazine brake of assembly 365 and dispenser generator clutch cannot be energized. Contacts #6 and #5 apply power to the dispenser generator brake. Contacts #3 and #2 apply power to the output magazine loading clutch of assembly 365. Thus all plates are removed from the turret and none are to be toned. Contacts #13 and #12 apply power to the electromagnet on the program timer and start the machine cycle. The equipment continues to cycle until the output magazine contains 65 plates at which time the program timer stops at the end of its cycle. This is the result of S–3 energizing K4 relay whose contacts #1 and #3 de-energize K9 relay. The magazine ready light will also operate at this time.

The toner level light is actuated by a float switch A7S1, when the toner reservoir falls below a predetermined level. Also, this switch energizes K5 relay. Contacts #6 and #5 on this relay energize K14 time delay relay. The purpose of this relay timer is to control the toner dispenser motor A7B1. The motor operates for a predetermined time and dispenses the proper amount of toner to replenish the reservoir. This de-actuates float switch A7S1. The toner level indicator de-energizes along with K5 relay. This sequence causes the K14 timer relay to reset.

The K13 relay is the interlock relay and remains energized as long as all door and panel switches are closed. If a panel is ajar or accidently opened, power is removed from all points in the equipment except the input lines to the fuse panel, the K13 relay contacts, and the control panel. If K13 is de-energized during normal operation of the equipment, all holding circuits are broken and the program timer stops. When power is returned, the program timer continues to run to its home position where it will stop.

By the above description, there is disclosed apparatus for automatically applying electroscopic powder uniformly onto the surface of a donor plate. Obviously, however, the apparatus of the invention can be employed for applying electroscopic powders to any surface regardless of the use to which the plate is ultimately to be put. In the instant invention, there is affected a seriatim feeding of image plates from an input magazine containing image plates previously untoned or previously toned and submitted for reapplication of a uniform toner layer. The plates are removed from the input magazine and processed through a series of operating stations in which toner is applied and inspected for uniformity and density before being discharged into an output magazine. After the output magazine has been loaded with image plates uniformly toned in accordance with a predetermined standard, the magazine can be removed from the apparatus for remote utilization.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. Apparatus for the application of electroscopic powder onto plate surfaces, said apparatus comprising:
   (a) support means to support a plurality of plates on which electroscopic powder is to be applied;
   (b) means to discharge an aerosol of electroscopic powder in a controlled discharge path;
   (c) means to feed plates seriatim from said support means into said aerosol discharge path wherein to receive an application of the powder of the aerosol on the plate surface;
   (d) determination means to determine the homogeneity of powder application effected by said last recited means relative to a predetermined standard; and,
   (e) disposition means selectively responsive to the determination of said determination means to effect appropriate disposition of plates on which powder has been applied.

2. Plate dusting apparatus comprising:
   (a) means to support a magazine containing a quantity of plates to be dusted;
   (b) means to receive plates from the magazine on its support means and to advance received plates sequentially into operative relation with a plurality of operative stations, said stations including;
      (1) a first station having means for dusting a quantity of electroscopic powder onto the surface of a plate supported thereat; and,
      (2) a second station having means to determine the density of powder applied to the plate surface at said first station relative to a predetermined standard;
   (c) means responsive to the determination at said second station to indicate utilization acceptability of the powder-bearing plate.

3. Plate dusting apparatus comprising:
   (a) means to support a magazine containing a quantity of plates to be dusted;
   (b) means to load plates seriatim from the magazine on its support means onto plate advancing means, said plate advancing means being adapted to advance plates sequentially into operative relation with a plurality of stations, said stations including:
      (1) a first station having means for dusting a quantity of electroscopic powder onto the surface of a plate supported thereat;
      (2) a second station having means to determine the density of powder applied to the plate surface at said first station relative to a predetermined standard; and
      (3) a third station having means to support a second magazine;
   (c) means to load image plates from said advancing means into the second magazine; and,
   (d) means responsive to the determination of said second station to selectively actuate said last recited plate loading means as plates are advanced to said third station.

4. Plate dusting apparatus comprising:
   (a) magazine support means to support a magazine containing a quantity of plates to be dusted;
   (b) means to feed plates seriatim from the magazine on its support means to a plate advancing means, said plate advancing means being movable in a path of movement to pass plates thereon sequentially into operative relation with a series of stations, said stations including:
      (1) a first station having means to dust a quantity of electroscopic powder electrostatically charged to a selected polarity onto surface of a plate supported thereat;
      (2) a second station having means to determine the density of powder dusted onto the plate surface at said first station relative to a predetermined standard; and
      (3) a third station having means to support a second magazine for receiving plates from said plate advancing means;
   (c) plate loading means to load image plates from said plate advancing means to the second magazine; and,
   (d) means responsive to the determination at said second station to optionally actuate said plate loading means as a plate on said advancing means is advanced into operative relation with said third station.

5. Apparatus for the application of electroscopic powders onto plate surfaces, said apparatus comprising in combination:
   (A) support means to support a plurality of plates on which electroscopic powder is to be applied;
   (B) transport means to transport plates into operative relation with sequentially actuated operative devices; and,
   (C) means to feed plates seriatim from said support means onto said transport means;
   (D) said operative devices including;
      (1) means to discharge an aerosol of electrostatically charged electroscopic powder particles against a surface of a plate on said transport means causing said particles to be applied on the surface of the plate;
      (2) determination means to determine the density of powder applied on the plate surface effected by the last recited means relative to predetermined acceptable utilization limits; and,
      (3) means operative in response to said determination means including;
         (a) plate discharge means operative to discharge a plate determined by said determination means to contain an application of electroscopic powder within acceptable limits of utility; and,
(b) plate reject means to reject a plate determined by said determination means to contain an application of electroscopic powder within unacceptable limits of utility.

6. Apparatus for the application of electroscopic powder onto plate surfaces, said apparatus comprising:
(A) first magazine support means to support a first magazine for containing a plurality of individual plates on which electroscopic powder is to be applied;
(B) second magazine support means to support a second magazine for containing plates on which electroscopic powder has been applied;
(C) transport means to advance plates into operative relation with a plurality of operative devices;
(D) plate feeding means operative in timed relation to operation of said transport means to feed plates from a first magazine on said first support means onto said transport means; and,
(E) plate loading means selectively operative in timed relation to operation of said transport means to remove plates from said transport means and load the removed plates into a second magazine on said second support means;
(F) said operative devices including;
 (1) powder discharge apparatus to discharge an aerosol of electroscopic powder directed against a plate supported on the transport means whereby powder is caused to adhere to the plate surface;
 (2) determination means to determine the homogeneity of powder adhering to the plate surface applied by said powder discharge apparatus as compared to predetermined limits of utilization acceptability; and,
 (3) means responsive to determined results of said determination means to optionally;
  (a) actuate said transport loading means where the results of said determination are within the predetermined acceptable limits, or
  (b) reject plates when the results of said determination are not within the predetermined acceptable limits.

7. Apparatus for the application of electroscopic powder onto plate surfaces, said apparatus comprising:
(A) first magazine support means to support a first magazine for containing a plurality of individual plates on which electroscopic powder is to be applied;
(B) second magazine support means to support a second magazine for containing plates on which electroscopic powder has been applied;
(C) a rotatable turret disposed to rotate in a plane substantially parallel to the magazines on their support means, said turret having individual plate supports;
(D) drive means operatively connected to said turret to position said turret by sequential indexing through predetermined angles of rotation;
(E) a plurality of operative devices angularly displaced from each other at angles unitarily comparable to the index angle of said turret, each of said devices being operatively disposed to a plate in said turret at at least one position thereof;
(F) plate feeding means selectively operative in timed relation to operation of said drive means to feed plates from a first magazine on said first support means onto said turret;
(G) plate loading means selectively operated in timed relation to operation of said drive means to remove plates from said turret and load the removed plate into a second magazine on said second support means;
(H) said operative devices including;
 (1) powder discharge apparatus to discharge an aerosol of electroscopic powder directed against a plate supported on said turret whereby powder is caused to adhere to the plate surface;
 (2) determination means to determine the homogeneity of powder adhering to the plate surface applied by said powder discharge apparatus as compared to predetermined limits of utility acceptability;
 (3) means responsive to determined results of said determination means to optionally;
  (a) actuate said plate loading means wherein said determined results are within the predetermined acceptable limits, or
  (b) reject a plate when said determined results are not within the predetermined acceptable limits whereby a rejected plate remains on said turret for reprocessing.

8. Apparatus for the application of electroscopic powder onto plate surfaces, said apparatus comprising:
(A) first magazine support means to support a first magazine for containing a plurality of individual plates on which electroscopic powder is to be applied;
(B) second magazine support means to support a second magazine for containing plates on which electroscopic powder has been applied;
(C) a rotatable turret disposed to rotate in a plane substantially parallel to the magazines on their support means, said turret having individual plate supports;
(D) drive means operatively connected to said turret to position said turret by sequential indexing through predetermined angles of rotation;
(E) a plurality of operative devices angularly displaced from each other at angles unitarily comparable to the index angle of said turret, each of said devices being operatively disposed to a plate in said turret at at least one position thereof;
(F) plate feeding means selectively operative in timed relation to operation of said drive means to feed plates from a first magazine on said first support means onto the plate supports of said turret;
(G) plate loading means selectively operated in timed relation to operation of said drive means to remove plates from said turret and load the removed plate into a second magazine on said second support means;
(H) said operative devices including in sequential order:
 (1) plate cleaning means adapted to clean the surface of a plate on which powder is to be applied;
 (2) powder discharge apparatus to discharge an aerosol of electroscopic powder directed against a plate supported on said turret whereby powder is caused to adhere to the plate surface;
 (3) determination means to determine the homogeneity of powder adhering to the plate surface applied by said powder discharge apparatus as compared to predetermined limits of utility acceptability;
 (4) means responsive to determined results of said determination means to optionally;
  (a) actuate said plate loading means wherein said determined results are within the predetermined acceptable limits, or
  (b) reject a plate when said determined results are not within the predetermined acceptable limits whereby a rejected plate remains on said turret for reprocessing.

9. Apparatus for the application of electroscopic powder onto at least one surface of a transparent plate, said apparatus comprising:
(A) first magazine support means to support a first magazine for containing a plurality of individual transparent plates on which electroscopic powder is to be applied;
(B) second magazine support means to support a second magazine for containing plates on which electroscopic powder has been applied;
(C) a rotatable turret disposed to rotate in a plane substantially parallel to the magazines on their support means, said turret having individual plate supports;
(D) drive means operatively connected to said turret to position said turret by sequential indexing through predetermined angles of rotation;
(E) a plurality of operative devices at least some of which are angularly displaced from each other at angles unitarily comparable to the index angle of said turret, each of said devices being operatively disposed to a plate in said turret at at least one position thereof;
(F) plate feeding means selectively operative in timed relation to operation of said drive means to feed plates from a first magazine on said first support means onto the plate supports of said turret;
(G) plate loading means selectively operated in timed relation to operation of said drive means to remove plates from said turret and load the removed plate into a second magazine on said second support means;
(H) said operative devices including;
   (1) plate cleaning means adapted to clean the surface of a plate on which powder is to be applied;
   (2) powder discharge apparatus to discharge an aerosol of electroscopic powder directed against a plate supported on said turret whereby powder is caused to adhere to the plate surface;
   (3) second plate cleaning means adapted to clean the opposite surface of the plate from said first recited cleaning means;
   (4) determination means to determine the homogeneity of powder adhering to the plate surface applied by said powder discharge apparatus as compared to predetermined limits of utility acceptability.
   (5) means responsive to determined results of said determination means to optionally;
     (a) actuate said plate loading means wherein said determined results are within the predetermined acceptable limits, or
     (b) reject a plate when said determined results are not within the predetermined acceptable limits whereby a rejected plate remains on said turret for reprocessing.

10. Apparatus for the uniform application of electroscopic powder onto the surface of a donor plate, said apparatus comprising:
(A) first magazine support means to support a first magazine for containing a plurality of individual donor plates on which electroscopic powder is to be uniformly applied;
(B) second magazine support means to support a second magazine for containing plates on which electroscopic powder has been applied;
(C) a rotatable turret disposed to rotate in a plane substantially parallel to the magazines on their support means, said turret having individual plate supports;
(D) drive means operatively connected to said turret to position said turret by sequential indexing through predetermined angles of rotation;
(E) a plurality of operative devices angularly displaced from each other at angles unitarily comparable to the index angle of said turret, each of said devices being operatively disposed to a plate in said turret at at least one position thereof;
(F) plate feeding means selectively operative in timed relation to operation of said drive means to feed plates from a first magazine on said first support means onto the plate supports of said turret;
(G) plate loading means selectively operated in timed relation to operation of said drive means to remove plates from said turret and load the removed plate into a second magazine on said second support means;
(H) said operative devices including;
   (1) plate cleaning means adapted to clean the surface of a plate on which powder is to be applied;
   (2) powder discharge apparatus to discharge an aerosol of electroscopic powder in a controlled discharge path directed against a plate supported on said turret whereby powder is caused to releasably adhere uniformly on the plate surface;
   (3) determination means to determine the homogeneity of powder adhering to the plate surface applied by said powder discharge apparatus as compared to predetermined limits of utility acceptability;
   (4) means responsive to determined results of said determination means to optionally;
     (a) actuate said plate loading means wherein said determined results are within the predetermined acceptable limits, or
     (b) reject a plate when said determined results are not within the predetermined acceptable limits whereby a rejected plate remains on said turret for reprocessing.

References Cited in the file of this patent
UNITED STATES PATENTS

| | | |
|---|---|---|
| 2,458,674 | Blanchard et al. | Jan. 11, 1949 |
| 2,591,557 | Kraay et al. | Apr. 1, 1952 |
| 2,977,925 | Norton | Apr. 4, 1961 |
| 3,013,346 | Crumrine et al. | Dec. 19, 1961 |